United States Patent
Imamura et al.

(10) Patent No.: US 8,579,760 B2
(45) Date of Patent: Nov. 12, 2013

(54) ENGINE STARTUP CONTROL DEVICE FOR VEHICLE

(75) Inventors: Tatsuya Imamura, Okazaki (JP); Atsushi Tabata, Okazaki (JP); Keita Imai, Toyota (JP); Yuji Iwase, Mishima (JP); Takuma Kakinami, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1038 days.

(21) Appl. No.: 12/591,114

(22) Filed: Nov. 9, 2009

(65) Prior Publication Data

US 2010/0116235 A1    May 13, 2010

(30) Foreign Application Priority Data

Nov. 11, 2008  (JP) ................................. 2008-289262

(51) Int. Cl.
  *H02P 1/00* (2006.01)
  *H02P 3/00* (2006.01)
  *H02P 7/00* (2006.01)

(52) U.S. Cl.
  USPC .............................................. 477/7; 477/107

(58) Field of Classification Search
  USPC ................. 475/1, 5, 149, 150, 154, 198, 221; 477/7–9, 107; 180/65.21, 65.28
  See application file for complete search history.

(56) References Cited

U.S. PATENT DOCUMENTS

| | | | |
|---|---|---|---|
| 7,238,133 B2* | 7/2007 | Tabata et al. | 475/5 |
| 7,878,282 B2* | 2/2011 | Kumazaki et al. | 180/65.265 |
| 7,942,775 B2* | 5/2011 | Tabata et al. | 475/5 |
| 7,975,791 B2* | 7/2011 | Nozaki et al. | 180/65.6 |
| 8,152,667 B2* | 4/2012 | Shibata et al. | 475/5 |
| 2005/0209760 A1* | 9/2005 | Tabata et al. | 701/53 |
| 2007/0197336 A1* | 8/2007 | Tabata et al. | 475/150 |
| 2007/0213161 A1* | 9/2007 | Tabata et al. | 475/5 |
| 2009/0093331 A1* | 4/2009 | Iwanaka et al. | 475/5 |

FOREIGN PATENT DOCUMENTS

JP  A-2004-340010  12/2004

* cited by examiner

*Primary Examiner* — Justin Holmes
(74) *Attorney, Agent, or Firm* — Oliff & Berridge, PLC

(57) ABSTRACT

An engine start-up control device for a vehicle is provided with a structure which prevents the occurrence of an uncomfortable shock arising from amplified engine load torque fluctuation caused by resonance, when an output of a first motor generator starting up an engine by driving the same is limited. With a second motor generator having reactive torque restricting the rotation of a transfer member, the first motor generator rotatably drives a sun gear to crank the engine for start-up thereof. When this takes place, if the output of the first motor generator is limited, torque reference reactive-force control is executed to control reactive torque of the second motor generator in accordance with a predetermined torque whereby when the engine load torque exceeds a predetermined value, a rotation speed variation of the transfer member is permitted against reactive torque such that the rotation speed variation of the transfer member allows engine load torque to escape for thereby precluding engine load torque fluctuation to be amplified due to resonance.

20 Claims, 19 Drawing Sheets

| | C0 | C1 | C2 | B0 | B1 | B2 | B3 | SHIFTING RATIO | STEP | |
|---|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | | ○ | 3.209 | |
| N | | | | | | | | | |

○ ENGAGED  ◎ ENGAGED UPON STEP-VARIABLE, RELEASED UPON CONTINUOUSLY-VARIABLE

| | C0 | C1 | C2 | B0 | B1 | B2 | SHIFTING RATIO | STEP |
|---|---|---|---|---|---|---|---|---|
| 1st | ◎ | ○ | | | | ○ | 2.804 | 1.83 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | TOTAL 3.977 |
| R | | | | | ○ | ○ | 2.393 | |
| N | | | | | | | | |

○ ENGAGED    ◎ ENGAGED UPON STEP-VARIABLE, RELEASED UPON CONTINUOUSLY-VARIABLE

ENGINE STARTUP CONTROL DEVICE FOR VEHICLE

TECHNICAL FIELD

The present invention relates to an engine start-up control device for a vehicle, and, more particularly to an engine start-up control when an output of a first electric motor for starting up an engine by driving (cranking) the same is limited.

BACKGROUND ART

There has been known an engine start-up control device for a vehicle which includes a differential mechanism connected to an engine generating a drive power by combustion of fuel, a first electric motor, and a reactive-force receiving member whose rotation is restricted with a reactive torque controlled by a reactive-force control device. The engine start-up control device for the vehicle has an engine start-up control device for starting up the engine by driving the same by the first electric motor with the reactive-force control device caused to restrict the rotation of the reactive-force receiving member. One example of such engine start-up control device for the vehicle is disclosed in Patent Document 1 (Japanese Patent Application Publication No. 2004-340010). In the vehicle, the engine and first and second motor generators are connected to each other via a differential gear device (differential mechanism), under which the first motor generator starts up the engine by rotatably driving the same. When this takes place, the second motor generator is arranged to restrict the rotation of an output member (reactive-force receiving member) so as to allow an engine rotation speed to vary in a desired profile. In this case, a rotation speed of an output shaft basically depends on a vehicle speed, and the second motor generator, acting as the reactive-force control device, has an effect to supplementarily restrict the rotation of the output member.

In such an engine start-up control device for a vehicle of the related art, however, a battery is limited in charging or discharging at, for instance, under an extremely low temperature, during a drop in charge amount SOC or during a fully charged state of the battery, etc. This causes an output power (power-running torque or regenerative torque) of the first electric motor to be limited, resulting in a delay in rise of an engine rotation speed. Such a structure causes the engine rotation speed to stay for an extended time period in a resonant region (ranging from, for instance, 250 to 4000 rpm) that is determined in terms of rigidity etc. of a power transmitting system. This results in a occurrence of resonance due to torsional vibration of the power transmitting system with a resultant amplified fluctuation of a load torque (rotational resistance resulting from a pumping action and friction) of the engine, causing a risk of uncomfortable shock occurring through an engine mount or the like.

FIG. 13 is a timing chart for a hybrid vehicle shown in FIG. 1 for representing a sequence of cranking an engine 10 for start-up thereof. Under a neutral state in which a power transmitting is interrupted in an automatic shifting portion 20, the second motor generator MG2 (reactive-force control device) allows a rotation speed Nmg2 of a transfer member 18 (reactive-force receiving member) to be maintained at a zero level to receive a reactive force. In addition, the first motor generator MG1 (first electric motor) is rotatably driven for cranking or starting up the engine 10. This timing chart represents a normal state in which output of the first motor generator is unlimited. An engine rotation speed NE is immediately increased due to large power-running torque T1 to escape the resonant region in a short time period, causing no fear of uncomfortable shock arising due to resonance.

In contrast, if the output of the first motor generator MG1 is limited, then, there is a delay in rise time of the engine rotation speed NE by an amount corresponding to a decrease in power-running torque T1 of the first motor generator MG1 as shown in FIG. 25. This increases a time period by that extent for which the engine rotation speed stays in the resonant region. Thus, an amplified fluctuation of the engine load torque Te due to resonance occurs, resulting in the occurrence of uncomfortable shock.

The present invention has been completed with the above view in mind, and has an object to provide an engine start-up control device for a vehicle arranged to suppress the occurrence of uncomfortable shock, caused by engine load torque whose fluctuation is amplified due to resonance because of an increase of time period for the engine rotation speed to stay in a resonant region, when an output of the first electric motor enabled to rotatably drive an engine during start-up thereof is limited.

For achieving the above object, in a first aspect of the invention, an engine start-up control device for a vehicle which includes a differential mechanism connected to an engine generating a drive power by combustion of fuel, a first electric motor, and a reactive-force receiving member whose rotation is restricted with a reactive torque controlled by a reactive-force control device, the engine start-up control device starting up the engine by driving thereof by the first electric motor under a condition where the reactive-force control device restricts the rotation of the reactive-force receiving member. The engine start-up control device is operable to control the reactive-force control device such that in an output limiting state of the first electric motor, a rotation speed of the reactive-force receiving member varies at a greater rate than that in a state where the output of the first electric motor is unlimited.

In a second aspect, in the first aspect, during an engine start-up in the output limiting state of the first electric motor, the reactive torque of the reactive-force control device is decreased to permit the rotation speed of the reactive-force receiving member to vary at the greater rate than that in the state where the output of the first electric motor is unlimited.

In a third aspect, in the first or second aspect, during an engine start-up in the output limiting state of the first electric motor, a torque reference reactive-force control, to control the reactive torque of the reactive-force control device in accordance with a target torque, is executed.

In a fourth aspect, in the third aspect, the target torque is varied such that the lower an output power of the first electric motor in the output limiting state is, the smaller the target torque will be.

In a fifth aspect, in the third or fourth aspect, during the engine start-up in the output limiting state of the first electric motor, a variation amount of the rotation speed of the first electric motor is detected and the target torque is varied such that the greater a rotation speed variation is, the smaller the target torque will be.

In a sixth aspect, in one of the third to fifth aspects, during the engine start-up in the output limiting state of the first electric motor, an in-cylinder pressure of the engine is detected and the target torque is varied such that the higher the in-cylinder pressure is, the smaller the target torque will be.

In a seventh aspect, in the first aspect, during an engine start-up in the output limiting state of the first electric motor, a rotation-speed reference reactive-force control, to control the reactive torque of the reactive-force control device such that a rotation speed of the reactive-force receiving member follows a predetermined target rotation speed, is executed, and a deviation allowable value in the rotation speed of the reactive-force receiving member controlled by the rotation-speed reference reactive-force control is set to a value allowing the rotation speed of the reactive-force receiving member to vary at a predetermined rate.

In a eighth aspect, in one of the first to seventh aspects, the differential mechanism is disposed in a power transmitting path between an output shaft of the engine and drive wheels; and the reactive-force control device includes a second electric motor disposed to give a drive power to the power transmitting path and to receive the drive power from the power transmitting path.

According to the first aspect, the reactive-force control device is controlled such that in an output limiting state of the first electric motor, a rotation speed of the reactive-force receiving member varies at a greater rate than that in a state where the output of the first electric motor is unlimited. Thus, the rotation speed variation of the reactive-force receiving member allows the engine load torque to escape even if the engine rotation speed of which rise is delayed due to the output limitation of the first electric motor stays in the resonant region for a relatively extended time period. This suppresses the occurrence of amplified engine load torque fluctuation caused by resonance due to the torsional vibration of the power transmitting system. Such operation prevents uncomfortable shock from occurring due to an amplified engine load torque fluctuation.

According to the second aspect, during an engine start-up in the output limiting state of the first electric motor, the reactive torque of the reactive-force control device is decreased to permit the rotation speed of the reactive-force receiving member to vary at the greater rate than that in the state where the output of the first electric motor is unlimited. Thus, the rotation speed variation of the reactive-force receiving member, easily occurring against the reactive torque by that extent, allows the engine load torque to escape, thereby suppressing the occurrence of the amplified engine load torque fluctuation caused by resonance.

According to the third aspect, the target torque is varied such that the lower an output power of the first electric motor in the output limiting state is, the smaller the target torque will be. With such a control, for instance, a feedforward control is executed to control the reactive torque at a target torque for keeping the reactive-force receiving member at a predetermined rotation speed (of, for instance, "0" or a speed corresponding to a vehicle speed) in the presence of such a target torque. If the engine load torque exceeds a torque, corresponding to target torque, i.e., a torque determined by a gear ratio, etc., of the differential mechanism, a rotation speed of the reactive-force receiving member is caused to vary against the reactive torque. Such a rotation speed variation allows the engine load torque to escape, suppressing the amplified engine load torque fluctuation caused by resonance.

According to the fourth aspect, the target torque is varied such that the lower an output power of the first electric motor in the output limiting state is, the smaller the target torque will be. Such a structure causes the rotation speed variation of the reactive-force receiving member to easily occur, further effectively suppressing the amplified engine load torque fluctuation caused by resonance. That is, if the output of the first electric motor decreases, the engine rotation speed of which rise is delayed stays in the resonant region for long time period. This increases capability of occurring the amplified engine load torque fluctuation due to resonance by that extent. However, decreasing the target torque for the torque reference reactive-force at a rate depending on the output of the first electric motor allows the rotation speed variation of the reactive-force receiving member to occur with such a small amount of the engine load torque fluctuation. This suppresses the amplified engine load torque fluctuation caused by resonance.

On the contrary, if the reactive torque decreases to cause the rotation speed variation of the reactive-force receiving member to easily occur, then, a rise of the engine rotation speed is interrupted to further delay start-up of the engine. Therefore, it is preferable for the rotation speed variation of the reactive-force receiving member, caused by a drop in reactive torque, to be suppressed to a required minimum level. Thus, a value of the target torque is determined depending on the output of the first electric motor, which appropriately suppresses, with suppressing the occurrence of a delay in start-up of the engine to a minimal level, the occurrence of amplified engine load torque fluctuation caused by resonance.

According to the fifth aspect, during the engine start-up in the output limiting state of the first electric motor, a variation amount of the rotation speed of the first electric motor is detected and the target torque is varied such that the greater a rotation speed variation is, the smaller the target torque will be. Thus, the rotation speed variation of the reactive-force receiving member easily occurs to appropriately escape the engine load torque, thereby appropriately suppressing the occurrence of amplified engine load torque fluctuation caused by resonance. That is, since the variation amount of the engine rotation speed corresponds to the engine load torque fluctuation, an increase of the rotation speed variation means amplification of the engine load torque fluctuation caused due to resonance. Therefore, the target torque for the torque reference reactive-force is decreased at a rate depending on an actual rotation speed variation. Thus, with suppressing the delay in start-up of the engine caused by the drop in reactive torque to a required minimum level, the occurrence of amplified engine load torque fluctuation caused by resonance can be appropriately suppressed.

According to the sixth aspect, during the engine start-up in the output limiting state of the first electric motor, an in-cylinder pressure of the engine is detected and the target torque is varied such that the higher the in-cylinder pressure is, the smaller the target torque will be. Thus, the rotation speed variation of the reactive-force receiving member easily occurs to appropriately escape the engine load torque, thereby appropriately suppressing the occurrence of amplified engine load torque fluctuation caused by resonance. That is, the increased in-cylinder pressure of the engine increases the engine load torque to cause resonance. Thus, by decreasing the target torque for the torque reference reactive-force control at a rate depending on the actual in-cylinder pressure, with suppressing a delay in start-up of the engine caused by a drop in reactive torque to a required minimum level, the amplified engine load torque fluctuation caused by resonance can be appropriately suppressed.

According to the seventh aspect, during an engine start-up in the output limiting state of the first electric motor, a rotation-speed reference reactive-force control, to control the reactive torque of the reactive-force control device such that a rotation speed of the reactive-force receiving member follows a given target rotation speed, is executed, and a deviation allowable value in the rotation speed of the reactive-force receiving member controlled by the rotation-speed reference reactive-force control is set to a value allowing the rotation speed of the reactive-force receiving member to vary at a predetermined rate. Thus, permitting the rotation speed variation of the reactive-force receiving member to occur suppresses the amplification of the engine load torque fluctuation caused by resonance.

Like an eighth invention, an engine start-up control device for a vehicle of the present invention is preferably applied to an electric vehicle, including an engine in addition to first and second electric motors in which either one or both of the first and second electric motors is (are) used as a drive power source for running the vehicle, and the engine is exclusively used for electric power generator or to a hybrid vehicle in which both of the electric motors and the engine are used as a running drive power source. However, the engine start-up control device can also be applied to a vehicle in which only the engine is used as the running drive power source.

For the first and second electric motors for instance, electric motors which are rotatably driven with electric energy, or motor generators selectively rendering functions as the electric motors and electric power generators are preferably used. Depending on a structure, either one of the motor generators may function as the electric power generator. As the reactive-force control device, the second electric motor is preferably employed for instance, but a friction-engaging device (clutch and brake), operative to connect or disconnect (interrupt) a power transmitting path between a differential mechanism and drive wheels, may be used for controlling an engaging torque to control the rotation of the reactive-force receiving member. The engaging torque corresponds to the reactive torque. In addition, both of the second electric motor and the friction-engaging device can be used as a reactive-force control device to control the reactive torque by at least one of them.

As the differential mechanism, although a planetary gear set of a single pinion type or a double pinion type may be preferably used, a differential mechanism of a bevel gear type may also be used. The engine start-up control may be executed during for instance a halt of the vehicle, with controlling the reactive force using the second electric motor under a condition (neutral state etc.) in which the power transfer path is interrupted. In an alternative, the engine start-up control may be executed with controlling the engaging torque (reactive torque) under a condition in which the friction-engaging device of the power transfer path is half-engaged. Even under the running of the vehicle, the engine start-up control may be possibly executed during for instance a shifting of an automatic transmission by interrupting the power transmitting path or by causing the friction-engaging device for the shifting etc. to be half-engaged.

The output of the first electric motor is limited in the following cases. In one case, the output (power-running torque or regenerative torque) of the first electric motor is limited due to a limited a charging or discharging of a battery by for instance under an extremely low temperature, during a drop of charge SOC or during a fully charged state. In another case, the output of the first electric motor is limited due to a failure occurring therein. Under such cases, detecting the limited charging or discharging state of the battery and the presence of such a failure can determine whether to limit the output of the first electric motor. When the output of the first electric motor is limited due to the battery, in a case wherein a target torque is set to a value depending on the output of the first electric motor like a fourth invention, the output of the first electric motor can be acquired by referring to a data map, etc. This data map is preliminarily determined on experimental tests based on for instance a temperature of the battery and the charge amount SOC.

In a second invention, decreasing the reactive torque of the reactive-force control device permits the rotation speed of the reactive-force receiving member to significantly vary. This is because decreasing the reactive torque to a value less than a sharing torque, determined in terms of a gear ratio etc. of the differential mechanism for the engine load torque amplified due to resonance, allows the rotation speed of the reactive-force receiving member to vary. This prevents the engine load torque fluctuation due to resonance from amplifying in a further degree. Accordingly, the reactive torque may suffice to be determined such that the engine load torque fluctuation, arising from resonance, occurs at a magnitude less than a predetermined value.

In a third invention, a torque reference reactive-force control is executed for controlling the reactive torque of the reactive-force control device in accordance with the target torque. This is achieved in feedforward control such that for instance the reactive torque follows or lies at the target torque. The target torque used in such a case may be preferably determined depending on the output of the first electric motor, like the control executed in the fourth invention, but may be preliminarily determined to have a constant value. In the third invention, the torque reference reactive-force control is executed in the output limiting state of the first electric motor. In the absence of the output limiting state of the first electric motor, a rotation-speed reference reactive-force control is executed for controlling the reactive torque such that for instance the rotation speed of the reactive-force receiving member follows or lies at a predetermined target rotation speed. However, the torque reference reactive-force control may also be executed to provide a reactive force at a relatively large target torque. For instance, in the absence of the output limiting state of the first electric motor, the rotation of the reactive-force receiving member may be fixed to "0" or a predetermined rotation speed associated with the vehicle speed, by maximizing the regenerative torque of the second electric motor as the reactive-force control device, or by maximizing an engaging torque of an friction engaging device (reactive-force control device) disposed in the power transmitting path.

In the fourth invention, the lower the output power of the first electric motor is, the less the target torque becomes. In carrying out the third embodiment, a constant target torque may be preliminarily determined regardless of the output of the first electric motor. In addition, when the target torque is determined depending on the output of the first electric motor, a decrease of the reactive torque blocks an increase of the engine rotation speed with a resultant delay in start-up of the engine. Therefore, a predetermined lower limit may be preferably provided on the target torque or an actual reactive torque. This similarly applies to fifth and seventh inventions.

In the fifth and sixth inventions, the target torque may be altered on a real time basis in the course of the engine start-up control. In an alternative, the target torque may be corrected on learning to alter the target torque on subsequent execution of the engine start-up control. In the fifth invention, the variation amount of the rotation speed of the engine is detected to control such that the greater the variation amount is, the lower the target torque will be. In an alternative, the target torque may be lowered in multiple stages or in a continuous fashion depending on the rate or magnitude of the variation amount of the rotation speed. In another alternative, the target torque may suffice to be lowered when it exceeds a certain threshold value of the variation amount.

In the sixth invention, the in-cylinder pressure of the engine is acquired to perform a control such that the higher the in-cylinder pressure is, the less the target torque will be. In an alternative, the target torque may be lowered in multiple stages or in a continuous fashion depending on a level of the in-cylinder pressure. In another alternative, the target torque may suffice to be lowered when the in-cylinder pressure exceeds a certain threshold value. The in-cylinder pressure determined depending on a compression ratio, can be estimated by referring to opening and closing timings, associated with for instance opening and closing signals applied to intake and exhaust valves, the engine rotation speed and an intake air quantity, etc. The in-cylinder pressure, i.e., the compression ratio, is caused to increase at for instance the extremely lower temperature than that appearing at a normal temperature. Moreover, when applied to a flexible fuel vehicle enabled for ethanol etc., to be mixed to fuel at a predetermined mixing ratio, such a mixing ratio is detected to perform, a control such that the higher the mixing ratio is, the higher the in-cylinder pressure will be. Thus, the present invention may be preferably applied to such a vehicle in which the in-cylinder pressure is controlled.

In a seventh invention, the rotation-speed reference reactive-force control is performed to control the reactive torque of the reactive force control device in the feedback control or in a feedforward control depending on the target rotation speed. A deviation permit value may be simply adjusted by altering a gain of for instance the feedback control. Decreasing the gain increases the deviation permitting value. When the upper and lower limit values are set for the target rotation speed to control the reactive torque such that the rotation speed of the reactive-force receiving member falls in such upper and lower limit values, the upper and lower limit values may be altered depending on the deviation permit value. Thus, the present invention may be implemented in various modes.

Upon carrying out the seventh invention, the rotation speed of the reactive-force receiving member is permitted to significantly vary with a structure in which: (a) during engine start-up, the reactive torque of the reactive-force control device is controlled by the rotation-speed reference reactive-force control regardless of the presence of or absence of the output limitation of the first electric motor; and (b) during engine start-up the deviation permit value is set to lie or to follow at a higher value in the presence of the output limitation of the first electric motor, than in the absence of the output limitation. However, such a control in the absence of the output limitation of the first electric motor can be suitably determined. For instance, a regenerative torque of the first electric motor acting as the reactive-force control device may be maximized, or an engaging torque of a friction engaging device (reactive-force control device) disposed in the power transmitting path may be maximized, so that the rotation of the reactive-force receiving member may be fixed to "0" or a predetermined rotation speed etc., associated with the vehicle speed.

In an eighth invention wherein the second electric motor is used as the reactive-force control device, the second electric motor is disposed in the power transfer path between for instance the differential mechanism and the drive wheels, and the engine and the first electric motor are connected to other two rotary elements. In an alternative, the first and second electric motors may be replaced by one another to dispose the first electric motor in the power transmitting path between the differential mechanism and the drive wheels.

During the engine start-up with the output limitation of the first electric motor, performing the rotation-speed reference reactive-force control allows the reactive torque of the reactive-force control device to be controlled depending on the target rotation speed and sets the deviation permitting value so as to permit the rotation speed variation of the reactive-force receiving member. In determining such a deviation permit value, the same control as those of the fourth to sixth inventions can be applied. For instance, (a) the lower the output power of the first electric motor limited in the output limitation is, the greater the deviation permit value becomes; (b) during the engine start-up with the output limitation of the first electric motor, the variation amount of the rotation speed of the engine is detected to perform a control such that the greater the rotation speed variation is, the greater the deviation permit value will be; and (c) during the engine start-up with the output limitation of the first electric motor, the in-cylinder pressure of the engine is acquired to perform a control such that the higher the in-cylinder pressure is, the greater the deviation permit value will be. In these cases, it is possible to obtain the same advantageous effects as those of the fourth to sixth inventions.

BEST MODE FOR CARRYING OUT THE INVENTION

Now, various embodiments of the present invention will be described below in detail with reference to accompanying drawings.

Figure 1:
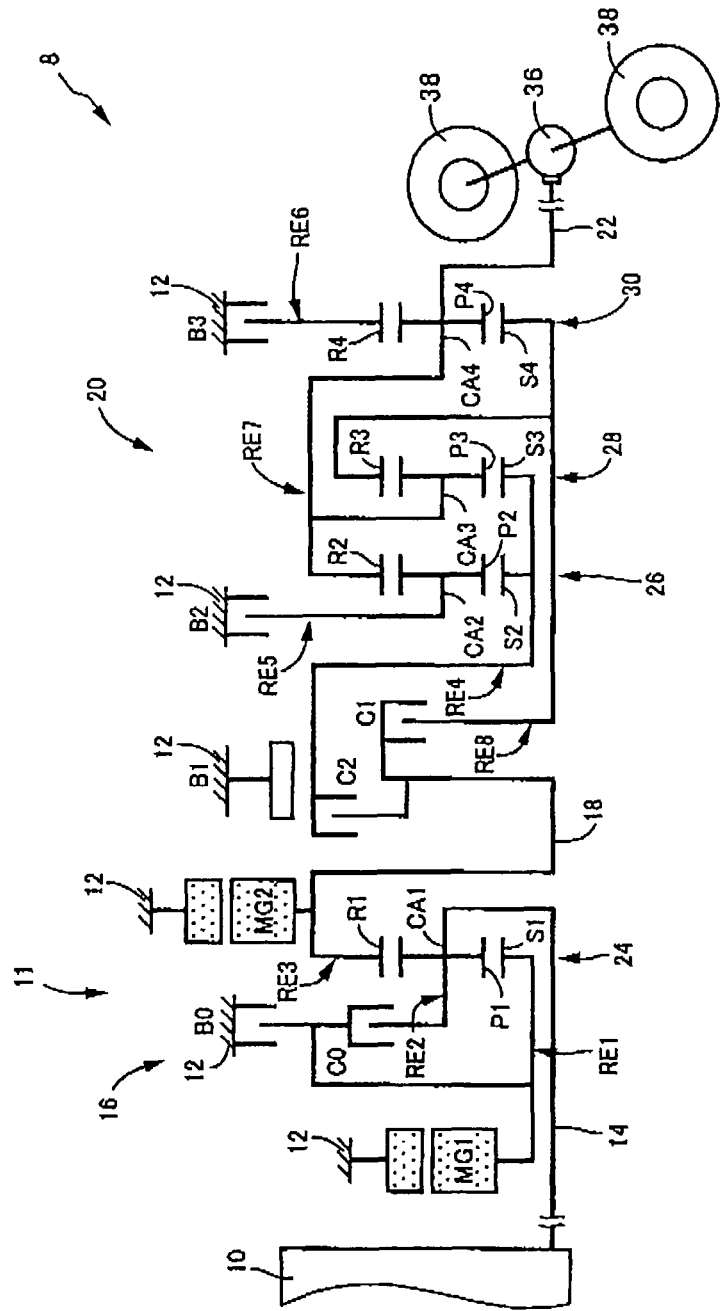
FIG. 1 is a skeleton view explaining a structure of a hybrid vehicle drive apparatus to which the present invention is applied.

FIG. 1 is a skeleton view illustrating a vehicular drive apparatus, to which the present invention is preferably applied, which is used for a hybrid vehicle including a drive power source composed of an engine 10 and first and second motor generators MG1 and MG2. As shown in FIG. 1, a shifting mechanism 8 includes following elements in series, which include an input shaft 14 disposed on a common axis within a transmission case 12 (hereinafter referred to as a "case 12"), serving as a non-rotary member, which is mounted on a vehicle body, a switchable type shifting portion 11 directly connected to the input shaft 14 or indirectly connected thereto through a pulsation absorbing damper (vibration damping device) not shown, a step-variable type automatic shifting portion 20 (hereinafter referred to as an "automatic shifting portion 20") connected to the switchable type shifting portion 11 in series via a transfer member (transfer shaft) 18 to function as an automatic transmission, and an output shaft 22 connected to the automatic shifting portion 20.

The shifting mechanism 8 is preferably applied to a longitudinally mounted FR (front engine and rear drive) type vehicle to allow outputs of the engine 10 and the motor generators MG1 and MG2 to be transferred from the output shaft 22 to a pair of drive wheels 38 via a differential gear device (final speed reducer) 36 and a pair of drive axles or the like. In addition, since the motor generators MG1 and MG2, the switchable type shifting portion 11 and the automatic shifting portion 20 have substantially symmetrical structures with respect to respective axes, lower halves of these structures are omitted in FIG. 1. The engine 10 takes the form of an internal combustion engine, such as a diesel engine or a gasoline engine, which generates a drive power upon combusting fuel.

The switchable type shifting portion 11 is a mechanical mechanism that mechanically synthesizes or distributes the output power of the engine 10 applied to the first motor generator MG1 and the input shaft 14. The switchable type shifting portion 11 includes a synthesizing and distributing mechanism 16 arranged to distribute the output power of the engine 10 to the first motor generator MG1 and the transfer member 18 or to synthesize the output power of the engine 10 and the output power of the first motor generator MG1 for delivery to the transfer member 18, and the second motor generator MG2 arranged to unitarily rotate with the transfer member 18. Both of the motor generators MG1 and MG2 have functions to serve as electric motors and electric power generators. The first motor generator MG1 is mainly used as the electric power generator to generate a reactive force and the second motor generator MG2 is mainly used as the electric motor to output or to give a drive force. The second motor generator MG2 has a rotation speed Nmg2 equal to a rotation speed of the transfer member 18.

The synthesizing and distributing mechanism 16 mainly includes a first planetary gear set 24 of a single pinion type having a predetermined gear ratio (the number of gear teeth of a ring gear/the number of gear teeth of a sun gear) $\rho 1$ in the order of, for instance, about "0.418", a switching clutch C0 and a switching brake B0. The first planetary gear set 24 includes three rotary elements, such as a first sun gear S1, a first carrier CA1 supporting first planetary gears P1 to be rotatable about their axes and about the axis of the first sun gear S1, and a first ring gear R1 held in meshing engagement with the first sun gear S1 through the first planetary gears P1.

The first carrier CA1 is connected to the input shaft 14, i.e., to the engine 10; the first sun gear S1 connected to the first motor generator MG1; and the first ring gear R1 connected to the transfer member 18. Further, the switching brake B0 is disposed between the first sun gear S1 and the transmission case 12 and the switching clutch C0 is disposed between the first sun gear S1 and the first carrier CA1. With both the switching clutch C0 and the switching brake B0 caused to disengage, the first sun gear S1, the first carrier CA1 and the first ring gear R1 are placed in a differential state to rotate relative to each other in a differential action. This causes the output power of the engine 10 to be distributed to the first motor generator MG1 and the transfer member 18. A part of the distributed output power of the engine 10 causes the first motor generator MG1 to generate electric energy, which in turn drive the second motor generator MG2 in a power-running mode. This establishes, for instance, a so-called continuously variable shifting state (electrically controlled CVT state) under which a rotation of the transfer member 18 is caused to continuously vary regardless of the engine 10 operating at a predetermined rotation. That is, a continuously variable shifting state is established to allow the switchable type shifting portion 11 to function as an electrically controlled continuously variable transmission with a speed ratio γ0 (a rotation speed of the input shaft 14/a rotation speed of the transfer member 18) caused to continuously vary in a value ranging from a minimum value γ0 min to a maximum value γ0 max.

The automatic shifting portion 20 includes a second planetary gear set 26 of a single-pinion type, a third planetary gear set 28 of a single-pinion type and a fourth planetary gear set 30 of a single-pinion type. The second planetary gear set 26 includes a second sun gear S2, a second carrier CA2 supporting second planetary gears P2 to be rotatable about their axes and about the axis of the second sun gear S2, and a second ring gear R2 held in meshing engagement with the second sun gear S2 via the second planetary gears P2, providing a given gear ratio p2 in the order of, for instance, about "0.562". The third planetary gear set 28 includes a third sun gear S3, a third carrier CA3 supporting third planetary gears P3 to be rotatable about their axes and about the axis of the third sun gear S3, and a third ring gear R3 held in meshing engagement with the third sun gear S3 via the third planetary gears P3, providing a given gear ratio p3 in the order of, for example, about "0-425". The fourth planetary gear set 30 includes a fourth sun gear S4, a fourth carrier CA4 supporting fourth planetary gears P4 to be rotatable about their axes and about the axis of the fourth sun gear S4, and a fourth ring gear R4 held in meshing engagement with the fourth sun gear S4 via the fourth planetary gears P4, providing a given gear ratio p4 in the order of, for example, about "0.421".

In the automatic shifting portion 20, the second and third sun gears S2 and S3 are unitarily connected to each other and selectively connectable to the transfer member 18 through a second clutch C2 and selectively connectable to the casing 12 through a first brake 81. The second carrier CA2 is selectively connectable to the casing 12 through a second brake B2 and the fourth ring gear R4 is selectively connectable to the casing 12 through a third brake B3. The second ring gear R2, the third carrier CA3 and the fourth carrier CA4 are unitarily connected to each other for connection to the output shaft 22. The third ring gear R3 and the fourth sun gear S4 are unitarily connected to each other to be selectively connectable to the transfer member 18 through the first clutch C1.

The switching clutch C0, the first clutch C1, the second clutch C2, the switching brake B0, the first brake B1, the second brake B2 and the third brake B3 (hereinafter merely referred to as a "clutch C" and a "brake B" unless otherwise specified) include hydraulic-type friction-engaging devices often used in a vehicular automatic transmission. Each of these devices includes a wet multi-disc type having a plurality of superposed friction plates available to be pressed against each other by a hydraulic actuator. Another type of these devices includes a band brake or the like that includes a rotary drum having an outer circumferential surface on which one or two bands are wound with a terminal end or ends tightened with a hydraulic actuator. Such structures allow associated component parts, between which each of those devices intervenes, to be selectively connected to each other.

Figures 2, 3:
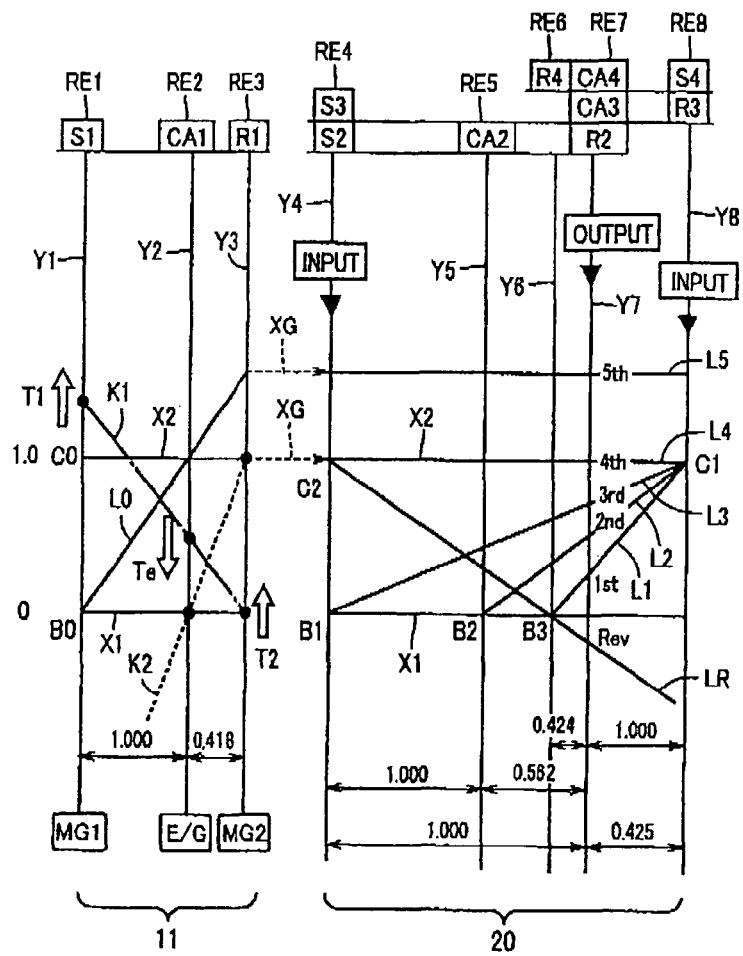
FIG. 2 is an engagement operation table illustrating the relationship between a shifting operation, in which the hybrid vehicle drive apparatus, shown in FIG. 1, is placed in a continuously variable or step-variable shifting state, and the operation of a hydraulic-type frictional engaging device in combination.
FIG. 3 is a collinear chart illustrating the relative rotation speed of rotary elements in each of different gear positions when the hybrid vehicle drive apparatus, shown in FIG. 1, is caused to operate in the step-variable shifting state.

In the shifting mechanism 8 of such a structure, as indicated in, for instance, an engagement operation table shown in FIG. 2, selectively engaging either one of the clutch C and the brake B allows one of a 1st-speed gear position "1st" to a 5th-speed gear position "5th", a reverse-drive gear position "R" or a neural position "N" to be selectively established.

Thus, each gear position provides a given speed ratio γ (a rotation speed $N_{in}$ of the input shaft 14/a rotation speed $N_{OUT}$ of the output shaft 22).

For the shifting mechanism 8 to function as the continuously variable transmission, both the switching clutch C0 and the switching brake B0 are disengaged as indicated in the engagement table shown in FIG. 2. This allows the switchable type shifting portion 11 to function as the continuously variable transmission, and the automatic shifting portion 20 connected thereto in series to function as the step-variable transmission. Thus, a rotation speed input to the automatic shifting portion 20, i.e., a second-motor rotation speed Nmg2, is caused to continuously vary for each of the 1st-speed, the 2nd-speed, the 3rd-speed and the 4th-speed gear positions "1st" to "4th" of the automatic shifting portion 20. This allows each of the "1st" to "4th" gear positions to have a continuously variable speed ratio range. Accordingly, the speed ratio can be continuously variable in a nonstep manner across the various gear positions "1st" to "4th" such that the shifting mechanism 8 as a whole has a total speed ratio (overall speed ratio) γT obtained in a nonstep fashion.

Meanwhile, causing the second clutch C2 and the third switching brake B3 to engage establishes a reverse drive gear position "R" having the speed ratio γ in the order of, for example, about "3.209". Causing all of the clutch C and the brake B to disengage establishes a power transfer interrupting state, i.e., a neutral "N" state. For the reverse drive gear position "R" and the neutral "N", both the clutch C0 and the brake B0 are disengaged to place the switchable type shifting portion 11 in a substantially continuously variable shifting state.

FIG. 3 shows a collinear chart in which the rotation speeds of various rotary elements, placed in different connecting states for respective gear positions, can be connected in straight lines for the shifting mechanism 8 comprised of the switchable type shifting portion 11 serving as a continuously variable shifting portion or a first shifting portion, and the automatic shifting portion 20 functioning as a step-variable shifting portion or a second shifting portion. The collinear chart of FIG. 3 is a two-dimensional coordinate system representing the relative relations among the gear ratios ρ established with the planetary gear sets 24, 26, 28 and 30 in directions along horizontal axes while representing the relative rotation speeds in directions along vertical axes. Among three horizontal axes, the lowermost horizontal line X1 indicates a rotation speed "0" and an upper horizontal line X2 indicates a rotation speed "1.0", i.e., a rotation speed NE of the engine 10 connected to the input shaft 14. A horizontal axis XG indicates a rotation speed of the transfer member 18.

Further, three vertical lines Y1, Y2 and Y3 correspond to the three rotary elements of the synthesizing and distributing mechanism 16 forming the switchable type shifting portion 11. The vertical lines Y1, Y2 and Y3 represent, in the order from the left, a first rotary element RE1 in the form of the first sun gear S1, a second rotary element RE2 in the form of the first carrier CA1 and a third rotary element RE3 in the form of the first ring gear R1. A distance between adjacent ones of the vertical lines Y1, Y2 and Y3 is determined in accordance with the gear ratio ρ1 of the first planetary gear set 24. In addition, five vertical lines Y4 to Y8 of the automatic shifting portion 20 represent, in the order from the left a fourth rotary element RE4 in the form of the first and second sun gears S1 and S2; a fifth rotary element RE5 in the form of the second carrier CA2; a sixth rotary element RE6 in the form of the fourth ring gear R4; a seventh rotary element RE7 in the form of the third and fourth carriers CA3 and CA4; and an eighth rotary element RE8 in the form of the third ring gear R3 and the fourth sun gear S4. Distances each between adjacent ones of the vertical lines Y4 to Y8 are determined based on the gear ratios ρ2, ρ3 and ρ4 of the second to fourth planetary gear sets 26, 28 and 30.

To describe the switchable type shifting portion 11 in more detail with reference to the collinear chart shown in FIG. 3, an inclined straight line L0, passing across an intersecting point between the lines Y2 and X2, represents the relationship between the rotation speed of the first sun gear S1 and the rotation speed of the first ring gear R1. When the switchable type shifting portion 11 is switched to the continuously variable shifting state by disengagements of, for example, the switching clutch C0 and the switching brake B0, the rotation speed of the first sun gear S1, indicated at an intersecting point between the straight line L0 and the vertical line Y1, is caused to increase or decrease upon controlling the reactive force of the first motor generator MG1 due to the generation of electric power (regenerative torque) thereof. Under such a state, the rotation speed of the first ring gear R1 indicated at an intersecting point between the straight line L0 and the vertical line Y3, i.e., the second-motor rotation speed Nmg2, is caused to increase or decrease.

To describe the automatic shifting portion 20 in more detail with reference to the collinear chart shown in FIG. 3, causing the first clutch C1 and the third brake B3 to engage allows the rotation speed (output-shaft rotation speed NOUT) of the output shaft 22 for the 1st-speed gear position "1st" to be indicated. That is, an intersecting point between an inclined straight line L1 and the vertical line Y7, representing the rotation speed of the seventh rotary element RE7 connected to the output shaft 22, represents such a rotation speed of the output shaft 22 for the 1st-speed gear position "1st". The straight line L1 lies at an intersecting point between the vertical line Y8, representing the rotation speed of the eighth rotary element RE8, and the horizontal line X2, while laying at an intersecting point between the vertical line Y6, representing the rotation speed of the sixth rotary element RE6, and the horizontal line X1. Likewise, an intersecting point between an inclined straight line L2 determined upon engagement of the first clutch C1 and the second brake B2, and the vertical line Y7 representing the rotation speed of the seventh rotary element RE7 connected to the output shaft 22, indicates the rotation speed of the output shaft 22 for the 2nd-speed gear position "2nd". An intersecting point between an inclined straight line L3 determined upon engagement of the first clutch C1 and the first brake B1, and the vertical line Y7 representing the rotation speed of the seventh rotary element RE7 connected to the output shaft 22, represents the rotation speed of the output shaft 22 for the 3rd-speed gear position "3rd". An intersecting point between a horizontal line L4 determined upon engagement of the first and second clutches C1 and C2, and the vertical line Y7 representing the rotation speed of the seventh rotary element RE7 connected to the output shaft 22, represents the rotation speed of the output shaft 22 for the 4th-speed gear position "4th".

Figure 4:
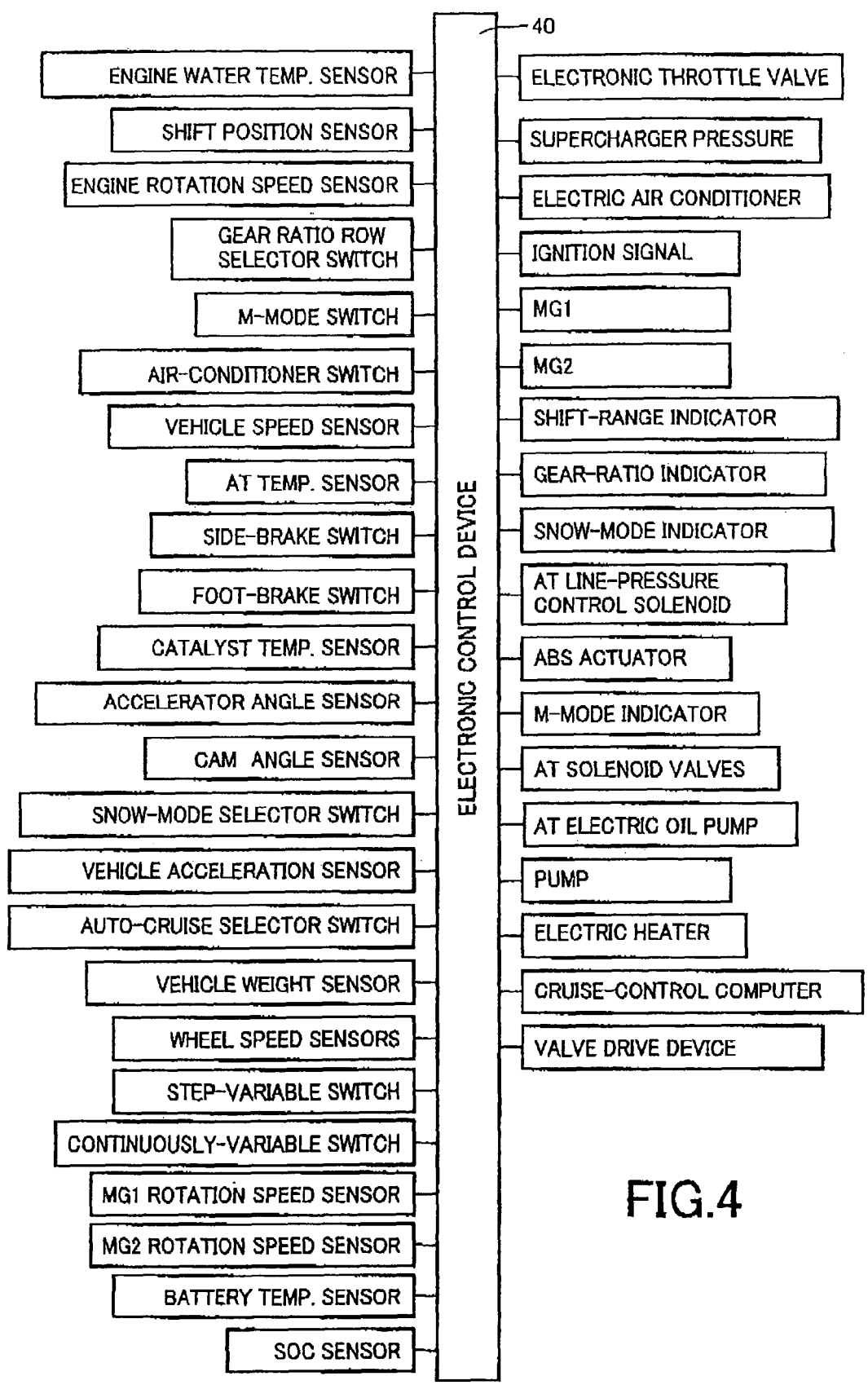
FIG. 4 is a view illustrating input and output signals to be input to or output from an electronic control device incorporated in the hybrid vehicle drive apparatus shown in FIG. 1.

FIG. 4 exemplifies various signals input to and output from an electronic control device 40 for controlling the shifting mechanism 8 of the present embodiment. The electronic control device 40 includes a so-called microcomputer incorporating a CPU, a ROM, a RAM and an input/output interface. Executing signal processing in accordance with programs preliminarily stored in the ROM, while utilizing a temporary storage function of the RAM, allows the executions of hybrid drive controls, related to the engine 10 and the first and second motor generators MG1 and MG2, and a shifting control of the automatic shifting portion 20.

The electronic control device 40 is connected to various sensors and switches, shown in FIG. 4, to receive various input signals therefrom. These input signals include a signal representing an engine cooling water temperature; a signal representing a selected shift position; a signal representing the engine rotation speed NE indicative of the rotation speed of the engine 10; a signal representing a gear ratio row determining value; a signal commanding an "M" (manually shift) mode to be initiated; an air-conditioning signal representing an air conditioner being under operation; a vehicle speed signal corresponding the rotation speed NOUT of the output shaft 22; an oil temperature signal representing a temperature (oil temperature) Toil of working oil filled in the automatic shifting portion 20; a signal representing a side brake being under operation; a signal representing a foot brake being under operation; a catalyst temperature signal representing a catalyst temperature; an accelerator displacement signal representing the displacement (demanded output) of an accelerator pedal; a cam angle signal; a snow mode setting signal representing a snow mode being set; an acceleration signal representing a fore and aft acceleration of a vehicle; an auto-cruising signal representing the vehicle running under an auto-cruising mode; a vehicle weight signal representing a weight of the vehicle; a drive wheel velocity signal representing a wheel velocity of each drive wheel; a signal representing the presence of or absence of a step-variable switching operation initiated for switching the switchable type shifting portion 11 to a fixed shifting state to allow the shifting mechanism 8 to function as the step-variable transmission; a signal representing the presence of or absence of a continuously-variable switching operation to switch the switchable type shifting portion 11 to a continuously variable shifting state such that the shifting mechanism 8 functions as the continuously variable transmission; a signal representing the rotation speed Nmg1 of the first motor generator MG1, and a signal representing the rotation speed Nmg2 of the second motor generator MG2, etc.

In addition, the electronic control device 40 provides various output signals including a drive signal applied to a throttle actuator for operating the opening degree of a throttle valve; a supercharger pressure regulating signal for regulating a supercharger pressure; an electric air-conditioner drive signal for actuating the electric air conditioner; an ignition signal commanding ignition timings of the engine 10; command signals commanding the first and second electric motors MG1 and MG2 to operate; a shift-position (selected operating position) display signal for activating a shift indicator; a gear-ratio display signal providing a display of a selected gear ratio; a snow-mode display signal providing a display of a snow mode under operation; an ABS actuation signal for actuating an ABS actuator to prevent the drive wheels from slipping during braking; an M-mode display signal for displaying an M-mode being selected; valve command signals for actuating electromagnetic valves incorporated in a hydraulic control circuit 42 (see FIG. 5) to control hydraulic actuators of hydraulically operated frictional engaging devices of the synthesizing and distributing mechanism 16 and the automatic shifting portion 20; a drive command signal for actuating an electrically actuated hydraulic pump serving as a hydraulic pressure source of the hydraulic control circuit 42; a signal for driving an electric heater; and a signal applied to a cruise-control controlling computer, etc.

In the present embodiment, besides, the electronic control device 40 is further connected to a battery temperature sensor for detecting a temperature (battery temperature) Tbat of a battery 60 (see FIG. 5), an SOC sensor for detecting a charge amount (residual capacity) SOC of the battery 60, and a valve drive device for controllably opening or closing intake and exhaust valves of the engine 10. The battery temperature Tbat and the signal representing the charge amount SOC delivered from the battery temperature sensor and the SOC sensor, are supplied to the electronic control device 40 from which opening and closing signals are output to the valve drive units for controlling opening and closing timings of the intake and exhaust valves of the engine 10.

Figure 5:
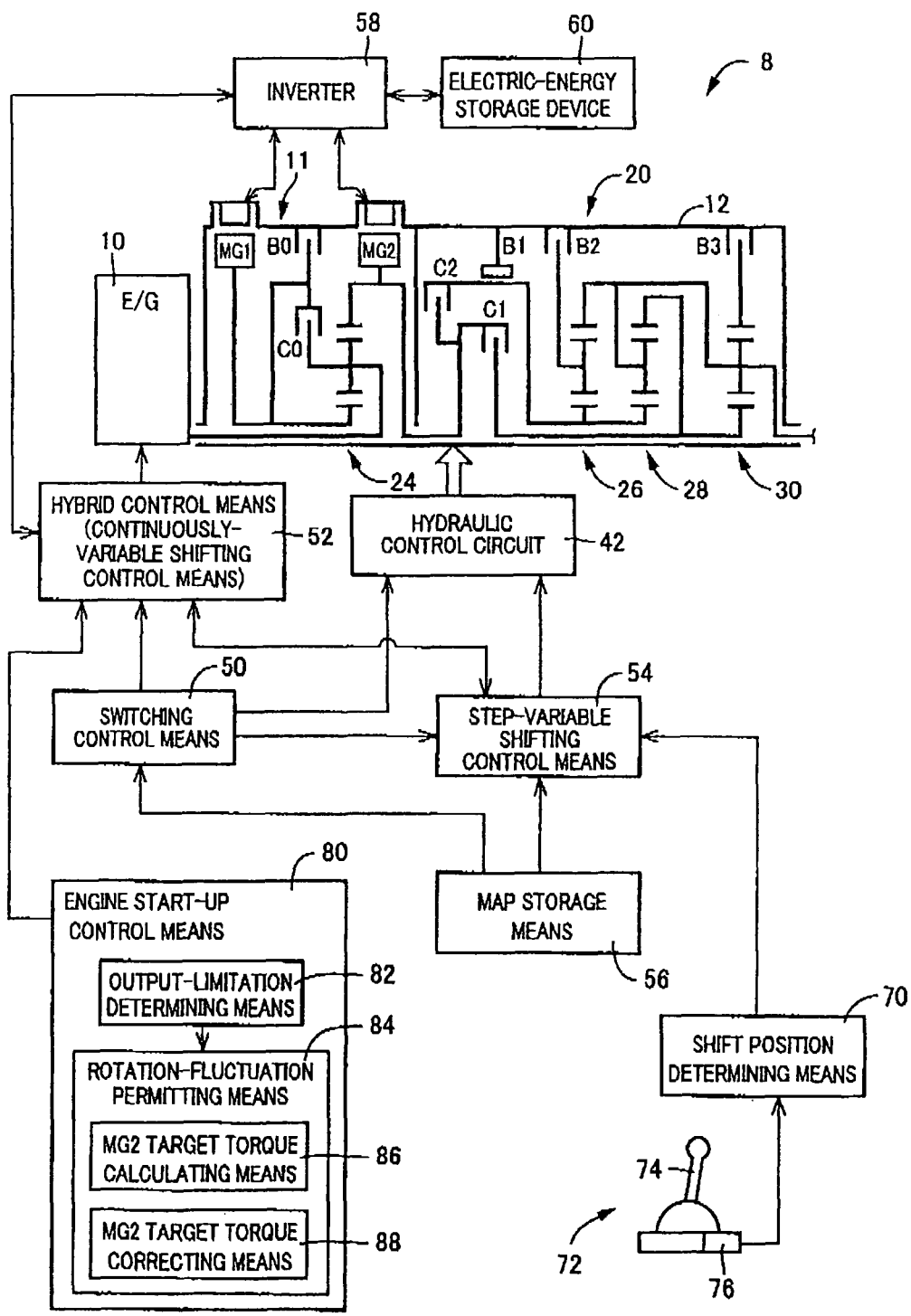
FIG. 5 is a functional block diagram illustrating a major control function to be executed by the electronic control device related to a first embodiment shown in FIG. 4.
Figure 6:
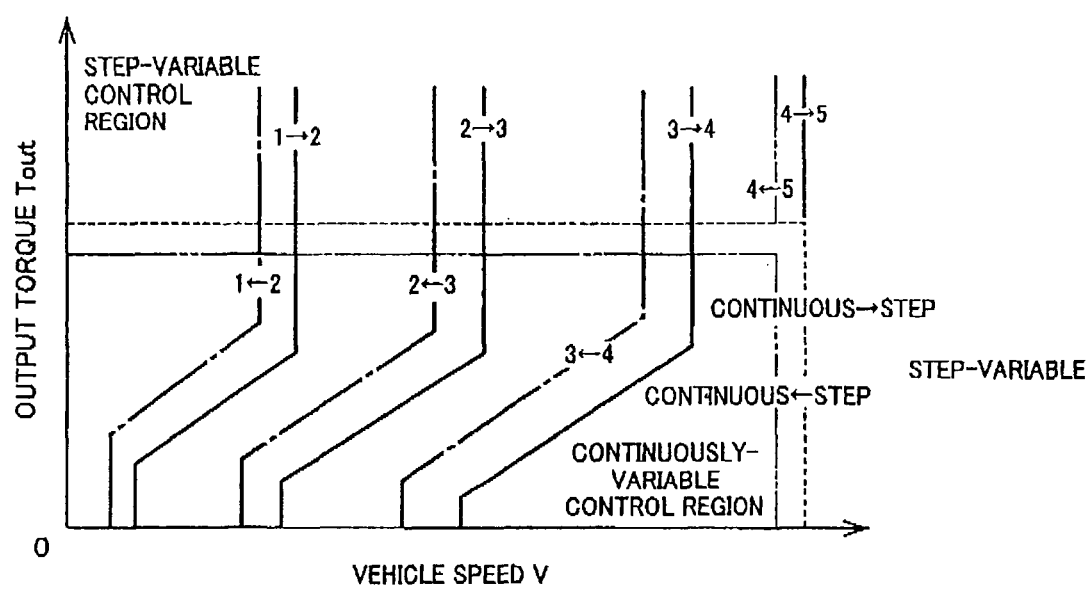
FIG. 6 is a view explaining switch operation of a switch control means.

In FIG. 5 which is a functional block diagram illustrating a major part of a control function to be executed with the electronic control device 40, switching control means 50 selectively switches the shifting mechanism 8 to either one of the continuously variable shifting state and the step-variable shifting state depending on a vehicle status. That is, the switching control means 50 executes an operation based on the vehicle status represented in terms of a vehicle speed V and an output torque Tout (replaceable with other drive-force correlated values) by referring to a switching map indicated by a broken line and double-dotted lines in FIG. 6 and preliminarily stored in, for instance, map storage means 56. This allows to determine as to whether a step-variable control region is present with a need for the shifting mechanism 8 to be switched to the step-variable shifting state. If a high vehicle speed or a high output torque is involved in the step-variable control region, then, the electronic control device 40 outputs a signal to hybrid control means 52 for inhibiting or canceling the executions of hybrid control or a continuously variable shifting control, while permitting step-variable control means 54 to perform a shifting control during a predetermined step-variable shifting. An output torque Tout is acquired based on, for instance, accelerator's displacement or a throttle valve opening, etc.

The hybrid control means 52 renders the engine 10 operative in an operating range at high efficiency under the continuously variable shifting state of the shifting mechanism 8, i.e., under the continuously variable shifting state of the switchable type shifting portion 11. Meanwhile, the hybrid control means 52 allows drive forces of the engine 10 and the first motor generator MG1 and/or the second motor generator MG2 to be distributed at optimum varying rates to control the speed ratio y0 of the switchable type shifting portion 11 acting as the electrically controlled continuously variable transmission. Further, step-variable shift control means 54 executes an operation based on the vehicle status represented in terms of the vehicle speed V and the output torque Tout by referring to a shifting map indicated by solid lines and single-dotted lines in FIG. 6 and preliminarily stored in, for instance, the map storage means 56 to determine a gear position to be established in the shifting mechanism 8. FIG. 2 shows combinations in operations of the hydraulically operated friction-engaging devices, i.e., the switching clutch C0 and the switching brake B0, which are selected in current shifting control. That is, a whole of the shifting mechanism 8, i.e., the switchable type shifting portion 11 and the automatic shifting portion 20, is rendered operative as the step-variable transmission to establish the gear position in accordance with the engagement table shown in FIG. 2.

Meanwhile, the switching control means 50 determines in accordance with the switching map preliminarily stored in the map storage means 56 that the continuously variable control region is present with a need for the shifting mechanism 8 to be switched to the continuously variable shifting state. In such a case, the switching control means 50 outputs a command to the hydraulic control circuit 42 for causing the switching clutch C0 and the switching brake B0 to disengage. This places the switchable type shifting portion 11 in the continuously variable shifting state to enable the continuously variable shifting such that a whole of the shifting mechanism 8 can obtain the continuously variable shifting state. At the same time, the switching control means 50 outputs a signal to the hybrid control means 52 permitting the hybrid controls to be executed, and outputs a signal to the step-variable shift control means 54 to permit the automatic shifting portion 20 to perform an automatic shifting in accordance with the shifting map preliminarily stored in the map storage means 56. In such a case, the step-variable shift control means 54 performs the automatic shifting with operations except for the engagements of the switching clutch C0 and the switching brake B0 on the engagement table shown in FIG. 2.

Thus, the switching control means 50 switches the switchable type shifting portion 11 to the continuously variable shifting state based on a predetermined condition such that the switchable type shifting portion 11 functions as the continuously variable transmission, and, the automatic shifting portion 20 connected thereto in series is caused to function as the step-variable transmission. With such a structure and operations, a drive force is obtained with an appropriately large magnitude. At the same time, the rotation speed, input to the automatic shifting portion 20, i.e., the second-motor rotation speed Nmg2, is caused to continuously vary for each of the 1st-speed, the 2nd-speed, the 3rd-speed and the 4th-speed gear positions of the automatic shifting portion 20 such that each gear position can obtain a continuously variable range in speed ratio. Accordingly, a speed ratio between the respective gear positions can be continuously variable in a nonstep fashion such that a whole of the shifting mechanism 8 is placed in the continuously variable shifting state with obtaining a total speed ratio γT in a nonstep fashion.

The hybrid control means 52 calculates a demanded output required by a driver based on, for instance, the accelerator's displacement and the vehicle speed V, calculates a required drive force based on the demanded output of the driver and a demanded charge value, and calculates the engine rotation speed NE and a total output on demand. Then, the hybrid control means 52 controls the engine 10 so as to obtain a predetermined engine output power based on the resulting total output and the engine rotation speed NE, and controls the amount of electric power generated by the first motor generator MG1. The hybrid control means 52 executes such controls on consideration of the selected gear position of the automatic shifting portion 20 or commands the automatic shifting portion 20 to initiate the shifting for improved fuel consumption etc. In such a hybrid control, the switchable type shifting portion 11 is rendered operative to function as the electrically controlled continuously variable transmission. This allows the engine rotation speed NE, determined for the engine 10 to operate in an operating range with increased efficiency, and the rotation speed of the transfer member 18, i.e., the second-motor rotation speed Nmg2, determined with the vehicle speed V and the gear position of the automatic shifting portion 20, to be consistent with each other. That is, the hybrid control means 52 determines a target value of the total speed ratio γT of the shifting mechanism 8 such that during the running of the vehicle in the continuously variable shifting mode, the engine 10 is caused to operate in accordance with a preliminarily stored optimum fuel economy curve with compatible driveability and fuel economy. Then, the hybrid control means 52 controls the speed ratio y0 of the switchable type shifting portion 11 so as to obtain such a target value, thereby controlling the total speed ratio γT within a variable range to enable a shifting, i.e., in a range of, for instance, 13 to 0.5.

During such a control, the hybrid control means 52 allows electric energy, generated by the first motor generator MG1, to be delivered to the battery 60 or the second motor generator MG2 via an inverter 58. Accordingly, a major part of the drive power of the engine 10 is mechanically transferred to the transfer member 18 and the first motor generator MG1 consumes a remaining part of the drive power of the engine 10 for generating electric power for conversion to electric energy. The electric power is supplied through the inverter 58 to the second motor generator MG2, from which a drive force is transferred to the transfer member 18. Thus, equipment, relating from generating electric energy to consuming such electric energy with the second motor generator MG2, constitute an electrical path in which the part of the drive power of the engine 10 is converted to electric energy which in turn is converted to mechanical energy. In addition, the hybrid control means 52 is capable of causing the vehicle to run in a motor-running mode due to an electrically controlled CVT function of the switchable type shifting portion 11 regardless of the engine 10 remaining under a halted state or an idling state. Moreover, the hybrid control means 52 is also capable of rendering the first motor generator MG1 and/or the second motor generator MG2 operative to cause the vehicle to run in the motor-running mode. Besides, the hybrid control means 52 is further capable of rendering the first motor generator MG1 and/or the second motor generator MG2 operative to cause the vehicle to run in the motor-running mode, even under a condition where the switchable type shifting portion 11 is placed in the step-variable shifting state (fixed shifting state) with the engine 10 remained halted.

Figure 7A:
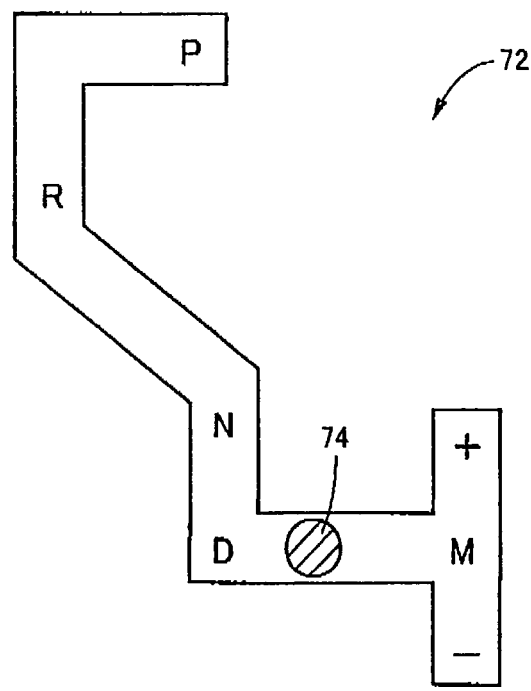
FIG. 7 is a view showing one sample of a shift operating device operated to select one of plural kinds of shift position, FIG. 7A being a view showing a shift pattern, and FIG. 7B being a view for explaining plural shifting ranges selectable at a M-mode.
Figure 7B:
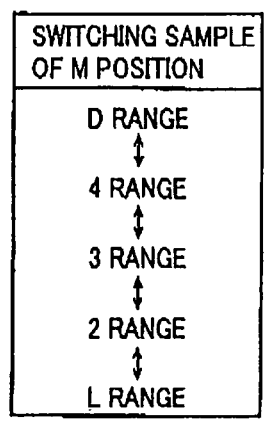

In FIGS. 5 and 7, a shift operation device 72, taking the form of a manual shift operating device including a shift lever 74 operable to select one of multiple kinds of shift positions, is mounted aside, for example, a driver's seat. The shift lever 74 can be manually shifted to select one of various shift positions. These include: a parking position "P (Parking)" under which the shifting mechanism 8 is placed in a neutral state in which all of the clutch C and the brake B thereof are caused to disengage with the interruption of a power transfer, and the output shaft 22 is locked up; a reverse-drive running position "R (Reverse)" for the vehicle to run in a reverse drive mode; a neutral position "N (Neutral)" under which the shifting mechanism 8 is placed in the neutral state; a forward-drive automatic-shift running position "D" Drive"; and a forward-drive manual-shift running position "M (Manual)". With the "D" position being selected, an automatic shift mode (D range) is established to perform a shifting control using all of the gear positions "1st" to 5th"

The shift operation device 72 includes a shift position sensor 76 for detecting an operated position of the shift lever 74 to output a shift position signal $P_{SH}$, representing the operated position of the shift lever 74, to shift position determining means 70. The shift position determining means 70 determines based on the shift position signal $P_{SH}$ as to whether the shift lever 74 is operated to any one of the operated positions, while determining as to whether in the "M" position, the shift lever 74 is operated to the upshift position "+" or the downshift position "−". The step-variable shifting control means 54 executes the shifting control of the automatic shifting portion 20 of the shifting mechanism 8 depending on a shift position determined with the shift position determining means 70, and, upon operation to the "N" position, causes all of the clutch C and the brake B of the shifting mechanism 8 to disengage such that the shifting mechanism 8 is placed in the neutral state.

The electronic control device 40 further functionally includes engine start-up control means 80, as shown in FIG. 5, which operates to start up the engine 10 during the running of the vehicle or a halt thereof for using the engine 10 as, for instance, a running drive power source, warming up the engine 10 at an extremely cold state or charging the battery 60 during a drop in the state of charge SOC of the battery 60. In the switchable shifting portion 11 placed in a differential state, with both of the clutch C and the brake B caused to disengage, the second motor generator MG2 is caused to restrict the rotation of the transfer shaft 18, i.e., the rotation of the first ring gear R1 of the first planetary gear set 24. Under such a state, the engine start-up control means 80 allows the first motor generator MG1 to be rotatably driven (in cranking) to start up the engine 10. That is, during the halt of the vehicle under which, for instance, the neutral state is established interrupting the power transfer of the automatic shifting portion 20, the first sun gear S1 is rotatably driven in a normal rotating direction due to a power-running torque T1 of the first motor generator MG1 as shown by a whitened arrow in the collinear chart of the switchable shifting portion 11 in FIG. 3. At the same time, a reactive torque T2 is provided to block the first ring gear R1 from rotating in a reverse rotating direction due to regenerative control or power-running control of the second motor generator MG2. This forcibly and drivably rotates the engine 10 in the normal rotating direction against the engine load torque Te (rotational resistance of the engine 10 due to a pumping action and a friction thereof). A straight line K1, indicated on a single-dotted line in FIG. 3, represents the relationship between rotation speeds of various parts during such an engine start-up.

Further, a straight line K2, indicated by a broken line in the collinear chart of the switchable shifting portion 11 shown in FIG. 3, represents the relationship between rotation speeds of various parts of the switchable shifting portion 11 during a motor-running mode with only the power-running control of the second motor generator MG2 being executed. Even in such a case, the regenerative control or power-running control of the first motor generator MG1 is executed to rotatably and forcibly drive or to start up the engine 10 in the normal rotating direction against the engine load torque Te, for starting up the engine 10. When this takes place, the gear position of the automatic shifting portion 20 and the vehicle speed V allows the rotation speed Nmg2 of the first ring gear R1 to be kept nearly constant. The second motor generator MG2 is additionally applied with a torque corresponding to the reactive torque T2, thereby preventing a drop in a drive force due to the reactive force resulting from the engine load torque Te. In addition, if the clutch C and the brake B of the automatic shifting portion 20 are brought into half-engagements during the shifting, a drop occurs in the rotation speed Nmg2 of the first ring gear R1 due to the reactive force of the engine load torque Te. However, additionally applying the torque, corresponding to the reactive torque T2, to the second motor generator MG2 allows the rotation speed Nmg2 of the first ring gear R1 to be maintained at a predetermined rotation speed, enabling the engine 10 to be forcibly and rotatably driven for start-up.

In the present embodiment, the first planetary gear set 24 corresponds to the differential mechanism; the first motor generator MG1 corresponds to a first electric motor; the second motor generator MG2 corresponds to a second electric motor having a function to act as a reactive-force control device; and the transfer member 18 connected to the first ring gear R1 corresponds to a reactive-force receiving member. In such a case, appropriately controlling the reactive torque T2 of the second motor generator MG2 enables the amount of fluctuation, in which the rotation speed Nmg2 of the first ring gear R1 fluctuates with a variation of the engine load torque Te, to be appropriately adjusted.

Further, controlling engaging torques of the clutch C and the brake B of the automatic shifting portion 20 in place of the second motor generator MG2 also results in a capability of restricting the rotation of the first ring gear R1 to accept the reactive force caused by the engine load torque Te. That is, the clutch C and the brake B of the automatic shifting portion 20 can be used as the reactive-force control device. During a halt of the vehicle with, for instance, the automatic shifting portion 20 placed in the 1st-speed gear position "1st", appropriately controlling the engagement torque (in hydraulic pressure) of the first clutch C1 enables the rotation of the first ring gear R1 to be restricted so as to accept the reactive force of the engine load torque Te. Thus, the engine 10 can be started up by being rotatably driven. Moreover, the amount of fluctuation, in which the rotation speed Nmg2 of the first ring gear R1 fluctuates with the variation of the engine load torque Te, can be appropriately adjusted. In such a case, the engagement torque of the first clutch C1 corresponds to the reactive torque. Likewise, even during the running of the vehicle, the engagement torque (reactive torque) can be adjusted using the clutch C and the brake B of the automatic shifting portion 20 as the reactive-fore control device, thereby enabling the engine 10 to start up.

At, for instance, under an extremely low temperature, during a drop in the state of charge SOC or during a fully charged state or the like, if a charging or discharging of the battery 60 is limited, then, an output (power-running torque or regenerative torque) of the first motor generator MG1 is limited. When this takes place, a delay occurs in rise time of the engine rotation speed NE, increasing time for the engine rotation speed NE to stay in a resonant region (in the order of, for instance, 250 to 400 rpm) that is determined with rigidity and the like of a power transfer system between the engine 10 and the first planetary gear set 24. This amplifies fluctuation in engine load torque Te due to the occurrence of resonance with a torsional vibration of the power transfer system, causing a risk of uncomfortable shock occurring to a driver. To overcome such a risk, the engine start-up control means 80 of the present embodiment functionally includes output-limitation determining means 82 and rotation-fluctuation permitting means 84. By performing signal processing in accordance with a flowchart shown in FIG. 8, the reactive torque T2 of the second motor generator MG2 is switched in control depending on whether the output of the first motor generator MG1 is limited. Step S1 in FIG. 8 corresponds to the output-limitation determining means 82, and step S2 corresponds to the rotation-fluctuation permitting means 84. In the following, explanation will be provided of a case in which the engine start-up control is executed during the halt of the vehicle under the neutral state in which the power transfer is interrupted in the automatic shifting portion 20.

Figure 8:
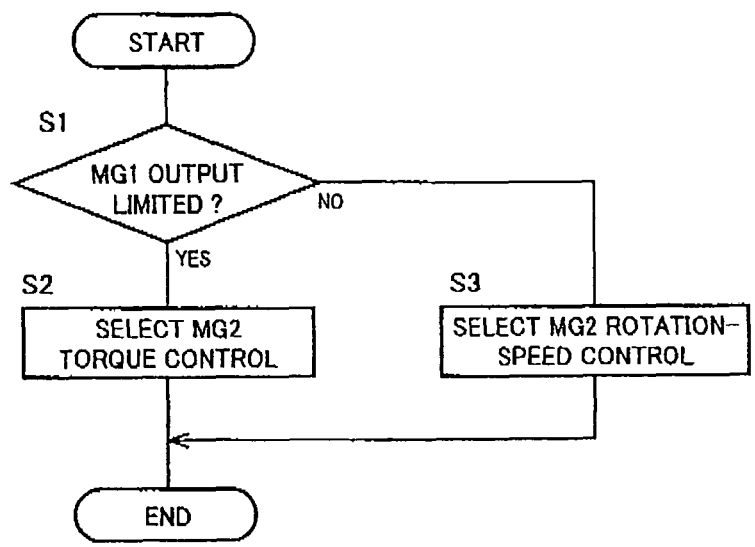
FIG. 8 is a flow chart illustrating a basic processing sequence to be executed with engine start-up control means shown in FIG. 5.

In step S1 in FIG. 8, the operation is executed based on, for instance, the battery temperature That and the state of charge SOC to make a query as to whether the output of the first motor generator MG1 is limited. This is made depending on whether the charging or discharging of the battery 60 is limited because of the extremely low temperature, the drop in the state of charge SOC or the fully charged state or the like. More particularly, such a determination is made based on whether the battery temperature Tbat is lower than a predetermined threshold value, whether the state of charge SOC is lower than a predetermined lower limit value or whether the state of charge SOC is greater than a predetermined upper limit value, etc. If no output of the first motor generator MG1 is limited, that is output of the first motor generator MG1 is unlimited, then, step S3 is executed to select a rotation-speed reference reactive-force control for controlling the reactive torque T2 of the second motor generator MG2 such that the rotation speed Nmg2 of the transfer member 18 acting as the reactive-force receiving member, i.e., the first ring gear R1, lies at a predetermined target rotation speed.

Figure 13:
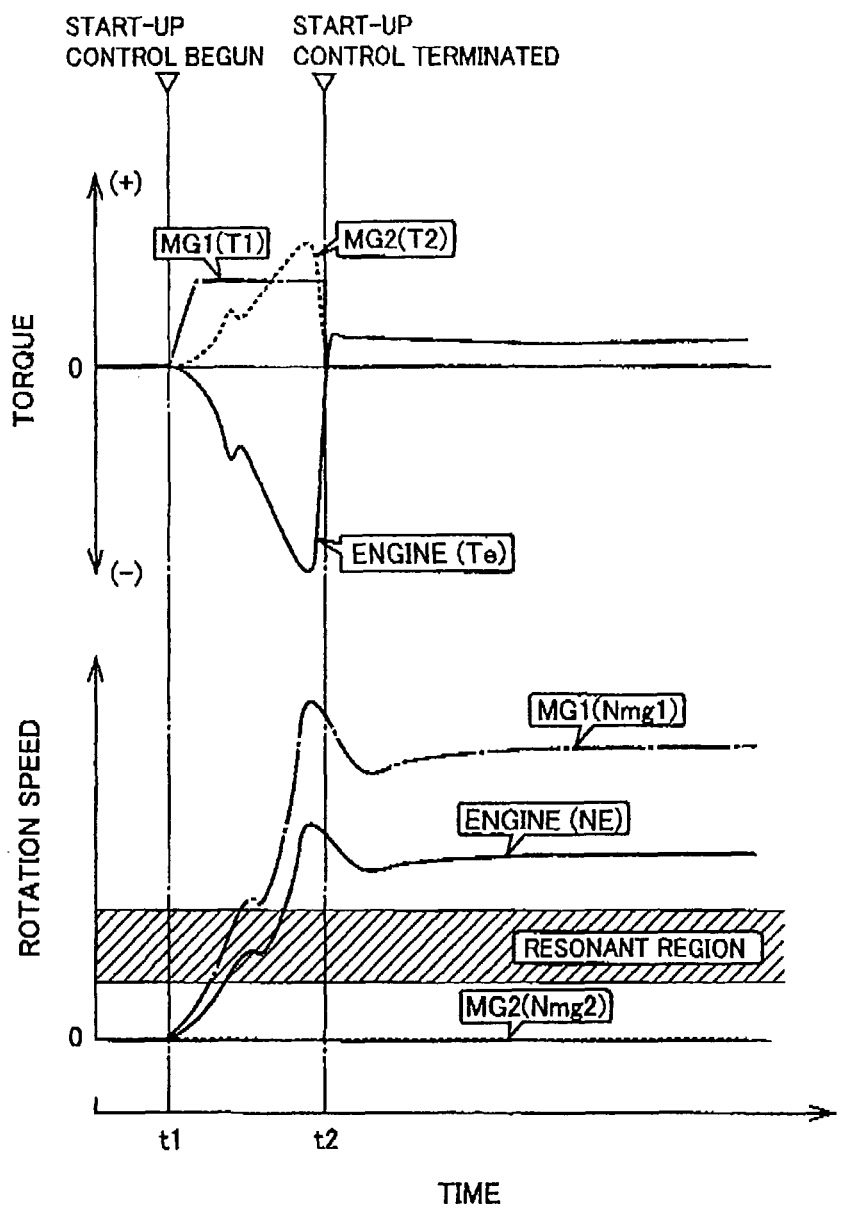
FIG. 13 is one example of a timing chart showing variations in torques and rotation speeds of various parts when an engine start-up control is executed by executing operation at step S3 shown in FIG. 8, with an output of a first motor generator for engine start-up being not limited.

To this end, the reactive torque T2 of the second motor generator MG2 is feedback controlled such that the rotation speed Nmg2 of the first ring gear R1 is kept zeroed. The first sun gear S1 is rotatably driven in the normal rotating direction due to the power-running torque T1 of the first motor generator MG1. Such an action causes the engine 10 to be forcibly and rotatably driven for start-up in the normal rotating direction against the engine load torque Te, thereby starting up the engine 10. A timing chart, shown in FIG. 13, represents the operations executed in such a phase. With the rotation speed Nmg2 of the transfer member 18 remained zeroed regardless in the engine load torque Te, the engine rotation speed NE is caused to rapidly increase of response to the power-running torque T1 of the first motor generator MG1 to pass across the resonant region for a short period of time. Thus, there is no risk of uncomfortable shock occurring due to resonance. Time t1 indicates a start time at which the engine start-up control begins. Time t2 indicates timing at which the engine 10 reaches a speed enabling to rotate under its own power to terminate the engine start-up control. In addition, the relationship between the engine rotation speed NE and the first-motor rotation speed Nmg1 is determined depending on the gear ratio ρ1 of the first planetary gear set 24, and a graph in the timing chart of FIG. 13 necessarily has no correspondence to the collinear chart shown in FIG. 3. This similarly applies to timing charts described below.

Meanwhile, if the answer to step S1 is YES (positive), i.e., when the output of the first motor generator MG1 is limited, then, step S2 is executed to select the torque reference reactive-force control for controlling the reactive torque T2 of the second motor generator MG2 in accordance with a predetermined MG2 target torque. That is, a feedforward control is performed so as to allow the reactive torque T2 to be brought into coincidence with the MG2 target torque, which prevents the transfer member 18 from rotating in a reverse rotation to keep the rotation speed Nmg2 zeroed. A shared torque of the first ring gear R1, determined with the gear ratio ρ1 of the first planetary gear set 24 depending on the engine load torque Te, exceeds the reactive torque T2 representing the MG2 target torque. With the torque reference reactive-force control being selected, the rotation speed Nmg2 of the transfer member 18 is caused to vary from "0" against the reactive torque T2. Thus, even if the engine rotation speed NE stays in the resonant region for a long period of time due to the limitation in the output (power-running torque) of the first motor generator MG1, permitting the rotation speed variation of the transfer member 18 results in an effect of escaping the engine load torque Te. This suppresses amplified engine load torque fluctuation caused by resonance.

The MG2 target torque may be preliminarily determined to have a constant value. However, if the MG2 target torque is too large with respect to the power-running torque T1 of the first motor generator MG1, the rotation speed variation of the transfer member 18 is hardly able to occur with a resultant difficulty of properly suppressing the occurrence of amplified engine load torque fluctuation caused by resonance. In contrast, if the MG2 target torque is too small relative to the power-running torque T1, then, the rotation speed variation of the transfer member 18 is permitted to occur at a rate more than necessary, disabling to adequately accept the reactive force of the engine load torque Te. This results in a delay in rise time of the engine rotation speed NE, blocking start-up of the engine 10. To avoid such a risk, the rotation-fluctuation permitting means 84 includes MG2 target torque calculating means 86 for determining the MG2 target torque depending on a torque (MG1 limiting torque) which the first motor generator MG1 can output or give to calculate the MG2 target torque in accordance with a flowchart shown in FIG. 9. In addition, if the MG1 limiting torque remained constant, the MG2 target torque can be appropriately set to a predetermined fixed value depending on such MG1 limiting torque with no need for the MG2 target torque calculating means 86 to be necessarily provided.

Figure 9:
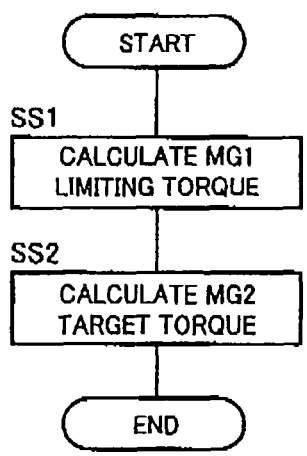
FIG. 9 is a flow chart illustrating a basic processing sequence to be executed with MG2 target torque calculating means shown in FIG. 5.
Figure 10:
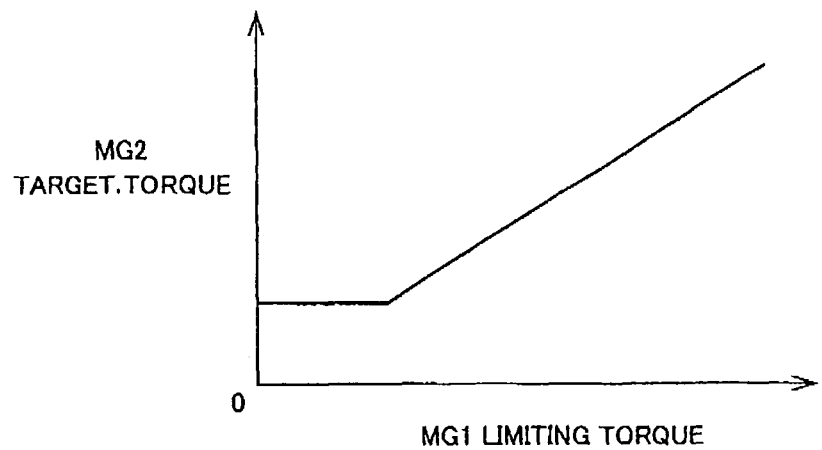
FIG. 10 is a view showing one example of a map used in calculating an MG2 target torque depending on an MG2 target torque to be executed at step S2 shown in FIG. 9.

At step SS1 in FIG. 9, the MG1 limiting torque which the first motor generator MG1 can output or give, is calculated based on the battery temperature That and the state of charge SOC causing the relevant output limitation, by referring to a map or the like in which such data are preliminarily determined as relevant parameters. At succeeding step SS2, a target torque (MG2 target torque) of the second motor generator MG2 is calculated based on the MG1 limiting torque by referring to, for instance, a map shown in FIG. 10. The lower the MG1 limiting torque is, the longer the rise time for the engine rotation speed NE to stay in the resonant region becomes due to the delay in rise time of the engine rotation speed NE. This increases probability of causing amplified engine load torque fluctuation caused by resonance by that extent. To address such a risk, the map shown in FIG. 10 is fundamentally determined such that the MG2 target torque will increase with a decrease in the MG1 limiting torque. However, if the MG2 target torque (reactive torque T2) drops below a predetermined value, then, there is a risk of a disturbance occurring to an increase of the engine rotation speed NE. This results in a remarkable delay in the start-up of the engine 10, which is consequently disabled to start up. To address such an issue, the MG2 target torque map, shown in FIG. 10, has a predetermined lower limit to allow the MG2 target torque to be kept at a predetermined lower value regardless of a drop in MG1 limiting torque.

Figure 14:
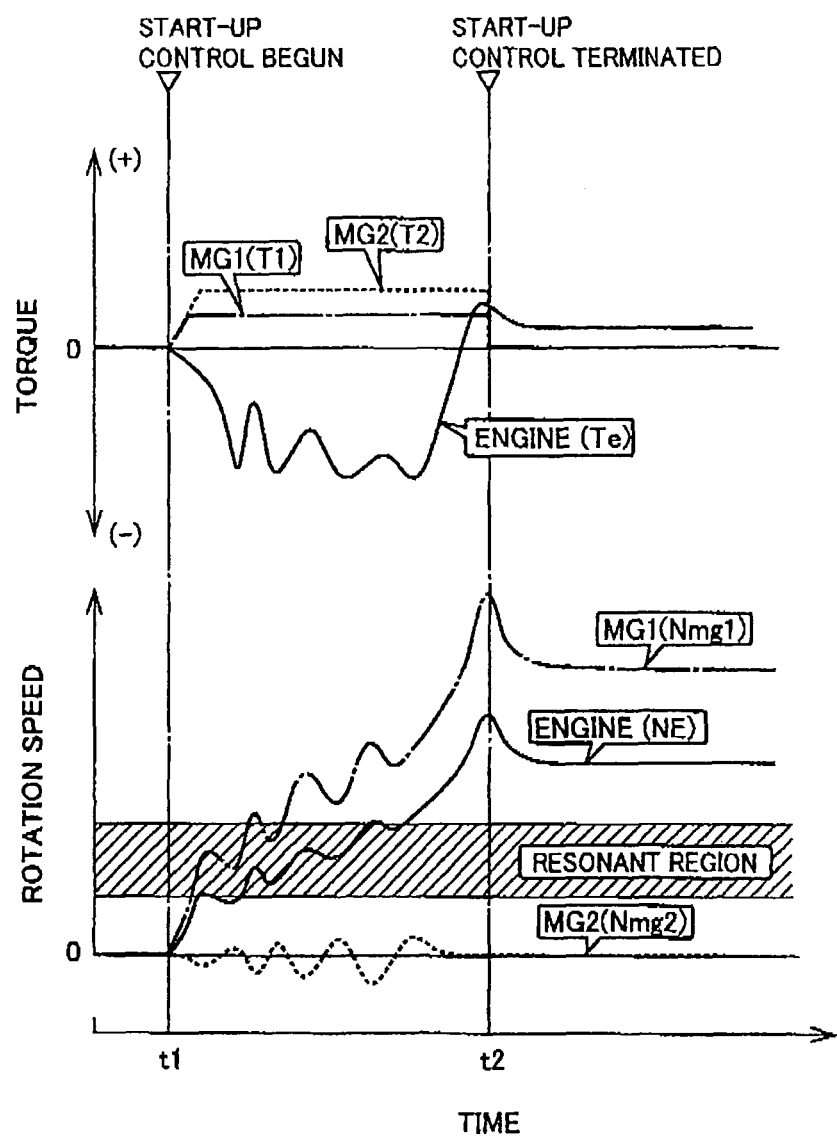
FIG. 14 is one example of a timing chart showing variations in torques and rotation speeds of the various parts when the engine start-up control is executed by executing operation at step S2 shown in FIG. 8, with the output of the first motor generator for engine start-up being limited.

Thus, the MG2 target torque is determined in such a way upon which the torque reference reactive-force control is executed to control the reactive torque T2 of the second motor generator MG2 to match the MG2 target torque. This suppresses amplified engine load torque fluctuation caused by resonance. This also suppresses the rotation speed variation of the transfer member 18, caused by a drop in reactive torque T2, to a required minimum extent regardless of an increase of the power-running torque T1 (MG1 limiting torque) of the first motor generator MG1, thereby appropriately starting up the engine 10. A timing chart, shown in FIG. 14, represents variations in the engine load torque and the rotation speed of the transfer member 18 occurring in such a sequence. Due to the limitation of the power-running torque T1, a delay occurs in the rise time of the engine rotation speed NE with a resultant increase of time for the engine rotation speed NE to stay in the resonant region. However, increasing the engine load torque Te results in a fluctuation of the rotation speed Nmg2 of the transfer member 18 against the reactive torque T2. Thus, the engine load torque Te escapes with a resultant suppression of amplified engine load torque fluctuation, and the rotation speed variation of the transfer member 18 caused by the drop in reactive torque is suppressed to the required minimal extent. Therefore, the engine rotation speed NE is caused to rapidly increase as fast as possible regardless of such a rotation speed variation, thereby enabling the engine 10 to start up within a relatively short period of time. The variation amount of the rotation speed Nmg2, shown in FIG. 14, varies depending on the MG2 target torque, i.e., the reactive torque T2 such that the smaller the MG2 target torque, the greater the variation amount will be.

Figure 11:
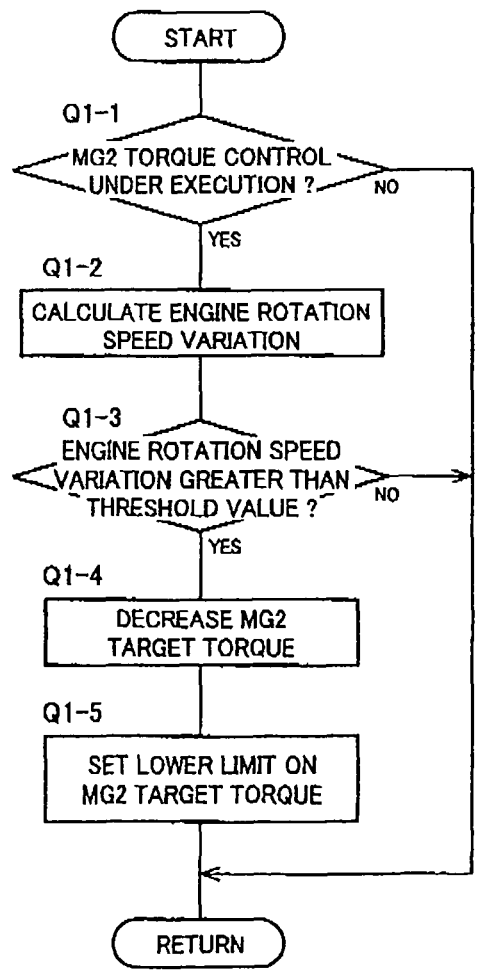
FIG. 11 is a flow chart illustrating a processing sequence to be executed when the MG2 target torque calculating means, shown in FIG. 5, corrects the MG2 target torque depending on a rotation speed variation amount of an engine.
Figure 12:
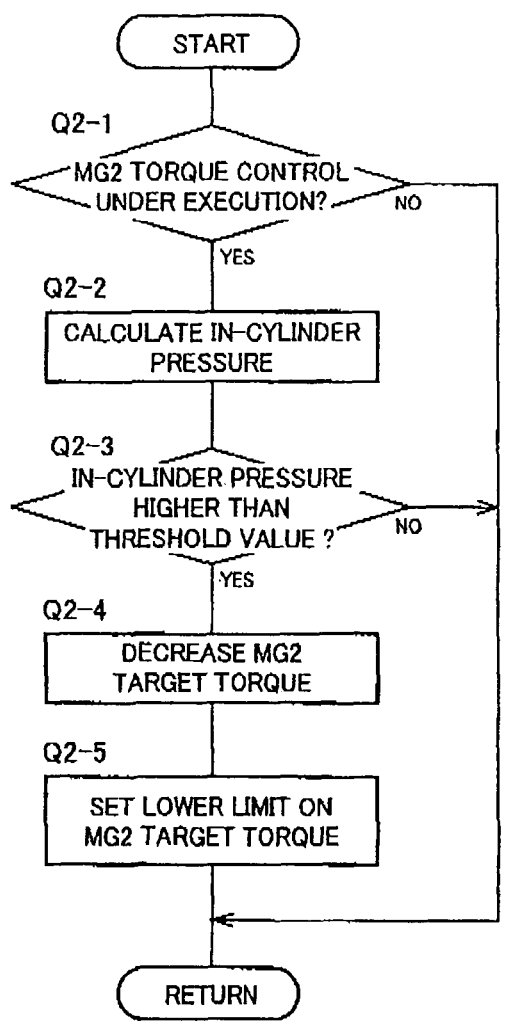
FIG. 12 is a flow chart illustrating a processing sequence to be executed when the MG2 target torque calculating means, shown in FIG. 5, corrects the MG2 target torque depending on a an in-cylinder pressure of the engine.

Turning back to FIG. 5, the rotation-fluctuation permitting means 84 includes MG2 target torque correcting means 88, which performs signal processing in accordance with flowcharts shown in FIGS. 11 and 12 to correct the MG2 target torque on a real time basis, enabling engine start-up control to be executed in a further appropriate fashion. The MG2 target torque correcting means 88 may be provided depending on needs and may be employed in place of the MG2 target torque calculating means 86. In addition, both of correcting operations, shown in FIGS. 11 and 12 may be executed, but either one of such operations may be merely executed depending on needs.

Figure 25:
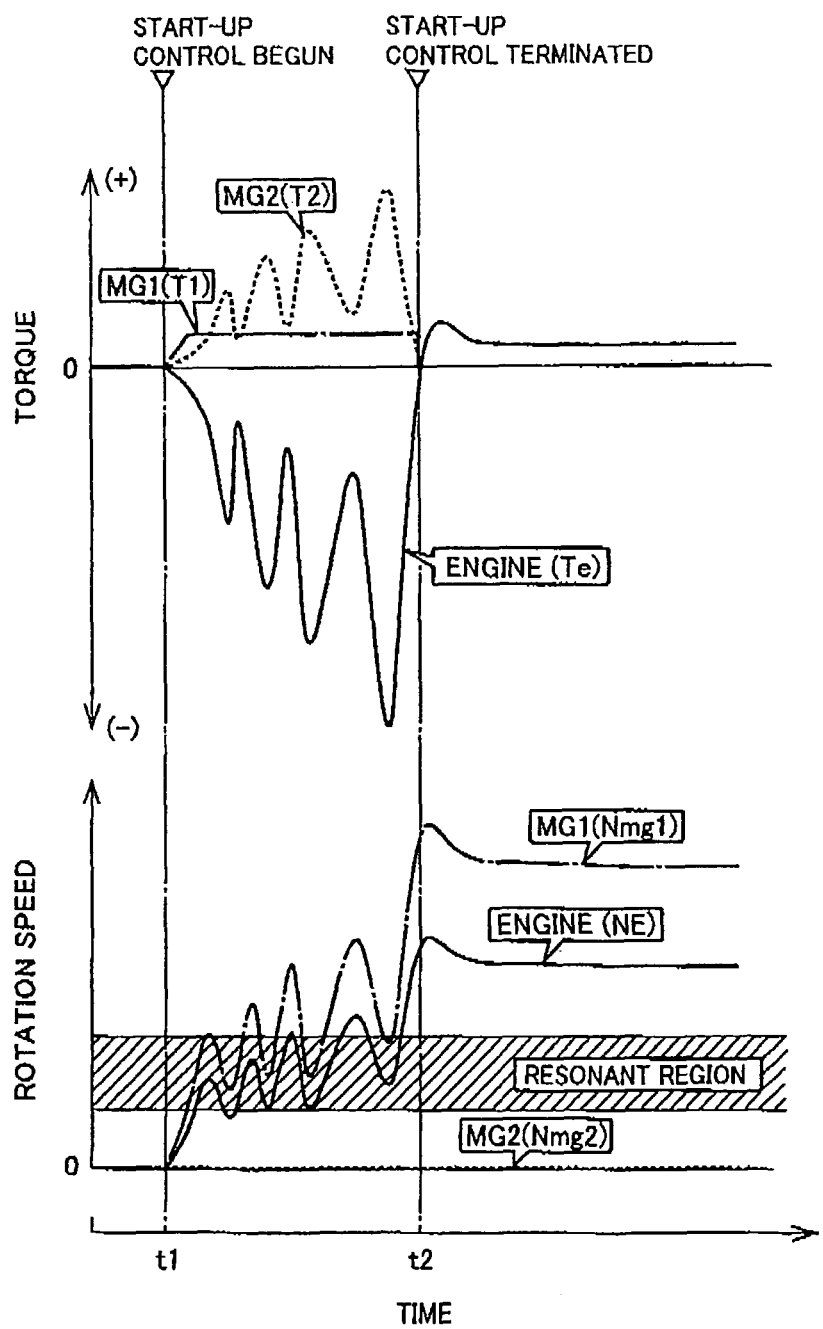
FIG. 25 is one example of a timing chart showing variations in torques and rotation speeds of the various parts when the engine start-up control is executed in the same way as that of step 3 shown in FIG. 8, with the output of the first motor generator MG1 for engine start-up being limited.

At step Q1-1 in FIG. 11, a query is made as to whether the torque reference reactive-force control is under the execution during the engine start-up for controlling the reactive torque T2 of the second motor generator MG2 when the output of the first motor generator MG1 is limited. If the reactive torque T2 is under control, then, operations subsequent to step Q1-2 are executed. At step Q1-2, the variation of engine rotation speed NE, i.e., for instance, a peak-to-peak value etc, between a local maximal value and a local minimal value occurring in a consecutive sequence is acquired. At step Q1-3, a query is made as to whether such a variation is greater than a predetermined threshold value. Such a threshold value may be determined to have a constant value or may be determined in accordance with a map or the like that is preliminarily predetermined as a parameter of elapsed time from the beginning (at time t1) of, for instance, the engine start-up control. This is because the variation of the engine rotation speed NE progressively increases depending on an amplified rate of the engine load torque fluctuation during a time interval for the engine rotation speed NE to stay in the resonant region as will be apparent from FIG. 25.

If such a variation is less than a threshold value, then, the operation is completed intact to sustain a current MG2 target torque. If such a variation exceeds the threshold value, then, step Q1-4 is executed to decrease the MG2 target torque. The reduction amount in MG2 target torque may be sustained at a constant value but may vary such that the greater the variation is, the greater the reduction amount will be. As the MG2 target torque (reactive torque 12) falls below a predetermined value with an increase of the variation of the engine rotation speed NE, under which the rotation speed variation of the transfer member 18 blocks the engine rotation speed NE from increasing. This results in a remarkable delay in start up of the engine 10. To avoid such a risk, at step Q1-5, the operation is executed to provide a predetermined lower limit on the MG2 target torque.

Thus, executing the torque reference reactive-force control using such a corrected MG2 target torque further appropriately suppresses amplified engine load torque fluctuation caused by resonance. That is, the rotation speed variation of the engine 10 reflects the engine load torque fluctuation. Thus, it means that an increase of the engine rotation speed variation causes the occurrence of amplified engine load torque fluctuation caused by resonance. Therefore, decreasing the target torque (MG2 target torque) for the torque reference reactive-force control depending on an actual engine rotation speed variation, with suppressing a delay in start-up of the engine 10 resulting from a drop in reactive torque T2, appropriately suppresses the occurrence of amplified engine load torque fluctuation. In addition, correcting the MG2 target torque depending on such an actual engine rotation speed variation can appropriately perform an engine start-up control regardless of an individual difference among vehicles and temporal changes thereof.

With the present embodiment, although the MG2 target torque is merely caused to decrease on a real time basis depending on the actual engine rotation speed variation, a whole of the map shown in FIG. 10 may be shifted downward in accordance with the correction made on the MG2 target torque. In an alternative, a learning correction may be executed to shift a whole of the map shown in FIG. 10 downward in accordance with the correction made on the MG2 target torque or to rewrite only data related to a current MG1 limiting torque. A learning correction may also be executed to increase or decrease the MG2 target torque map shown in FIG. 10 depending on the engine rotation speed variation and a start-up time (t2−t1) etc. during a series of operations, so that a resulting correction is reflected on a subsequent engine start-up control.

FIG. 12 shows a sequence of operations for correcting the MG2 target torque on a real time basis depending on an in-cylinder pressure of the engine 10. At step Q2-1, like at step Q1-1, a query is made as to whether the torque reference reactive-force control is under the execution to control the reactive torque T2 of the second motor generator MG2, during engine start-up when the output of the first motor generator MG1 is limited. At Q2-2, the in-cylinder pressure, i.e., a compression ratio, of the engine 10 is calculated by referring to, for instance, opening and closing tunings of opening and closing signals output to a valve driving device for drivably opening or closing intake and exhaust valves, the engine rotation speed NE and an intake air quantity or the like. The in-cylinder pressure is set to be higher for an extremely low temperature than that for a normal temperature. In addition, for a flexible fuel vehicle enabled to mix ethanol or the like at a predetermined mixing ratio, the relevant mixing ratio is detected to perform control such that the higher the mixing ratio, the higher will be the in-cylinder pressure.

As the in-cylinder pressure increases, the engine load torque Te is likely to increase with a resultant ease of causing resonance. At step Q2-3, therefore, a query is made as to whether the resulting in-cylinder pressure is greater than a predetermined threshold value. The threshold value may be determined to lie or to follow at a constant value. However, the in-cylinder pressure also progressively increases depending on an amplified rate of the engine load torque fluctuation during a period in which the engine rotation speed NE stays in the resonant region. Therefore, the threshold value may be determined in accordance with a map or the like that is preliminarily determined as a parameter of, for instance, an elapsed time from the beginning (at time t1) of engine start-up control. If the in-cylinder pressure is less than the threshold value, then, the operation is completed intact to allow the current MG2 target torque to be maintained. If the in-cylinder pressure exceeds the threshold value, then, steps Q2-4 and Q2-5 are executed, thereby correcting the MG2 target torque in the same manners as those executed in steps Q1-4 and Q1-5 of FIG. 11.

Even in such a case, performing the torque reference reactive-force control using such a corrected MG2 target torque further appropriately suppresses of amplified engine load torque fluctuation caused by resonance. That is, if the engine 10 has a high in-cylinder pressure, then, the engine torque Te is liable to increase with the resultant occurrence of resonance. Therefore, the torque reference reactive-force control is executed to decrease the target torque (MG2 target torque) depending on an actual in-cylinder pressure. This appropriately suppresses, with suppressing the occurrence of a delay in start-up of the engine 10, which would occur in the presence of a drop in reactive torque 12, to the minimal extent, the amplified engine load torque fluctuation caused by resonance. Moreover, correcting the MG2 target torque depending on such an actual in-cylinder pressure can appropriately perform the engine start-up control regardless of the individual difference among the vehicles and the temporal changes thereof.

With the present embodiment, the MG2 target torque is merely caused to decrease on the real time basis depending on the actual in-cylinder pressure. If applied to for instance the flexible fuel vehicle, a learning correction may be made to shift a whole of the map shown in FIG. 10 downward in accordance with a corrected rate of the MG2 target torque, or to rewrite only data associated with the current MG1 limiting torque. In addition, a learning correction may be executed to increase or decrease MG2 target torque on a real time basis depending on the current in-cylinder pressure, or to increase or decrease the MG2 target torque in FIG. 10. This makes it possible to allow a corrected result to reflect on a subsequent engine start-up control.

Figure 15:
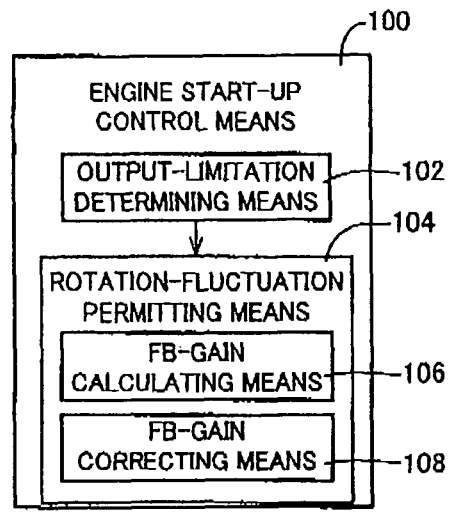
FIG. 15 is a functional block diagram illustrating another example of the engine start-up control means.
Figure 16:
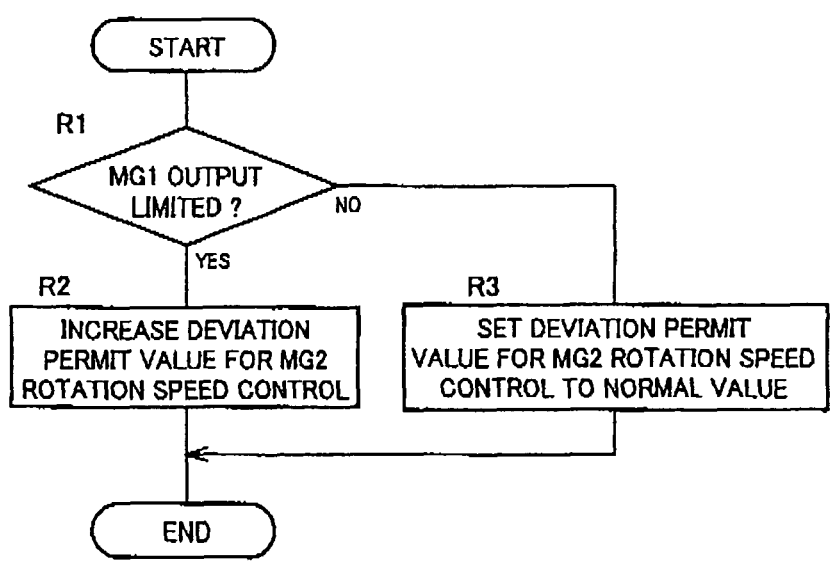
FIG. 16 is a flow chart illustrating a processing sequence to be executed in the engine start-up control means shown in FIG. 15.

FIG. 15 shows an embodiment in which, like the case in which output of the first motor generator MG1 is unlimited even during engine start-up when the output of the first motor generator MG1 is limited, the rotation-speed reference reactive-force control is executed for controlling the reactive torque T2 of the second motor generator MG2 to allow the rotation speed Nmg2 of the transfer member 18 to lie or to follow at a predetermined target rotation speed. This embodiment takes a structure including engine start-up control means 100 in place of the engine start-up control means 80. The engine start-up control means 100 functionally includes output-limitation determining means 102 and rotation-fluctuation permitting means 104, in which signal processing are executed in accordance with a flowchart shown in FIG. 16. In FIG. 16, step R1 corresponds to the output-limitation determining means 102 and step R2 corresponds to the rotation-fluctuation permitting means 104.

At step R1 in FIG. 16, like step S1 of the previous embodiment, a query is made as to whether the output of the first motor generator MG1 is limited. If the output of the first motor generator MG1 is limited, then, step R2 is executed. If the output of the first motor generator MG1 is not limited, then, step R3 is executed. At steps R2 and R3, the rotation-speed reference reactive-force control is executed to control reactive torque T2 of the second motor generator MG2 such that the rotation speed Nmg2 of the transfer member 18 lies at the predetermined target rotation speed (for instance, a value of "0" or a rotation speed determined based on the vehicle speed V). Upon executing the rotation-speed reference reactive-force control, the rotation speed Nmg2 of the transfer member 18 has different deviation allowable values. With the present embodiment, the rotation-speed reference reactive-force control is executed in feedback control. Since the feedback control has a gain (FB gain) to vary the deviation allowable value, different gains are set for steps R2 and R3, respectively.

That is, at step R3 in which output of the first motor generator MG1 is unlimited, a relatively large, predetermined constant FB gain (at a normal value), is determined to decrease the deviation allowable value such that the rotation speed Nmg2 of the transfer member 18 is kept in a predetermined target rotation speed. Therefore, executing the feedback control for the reactive torque T2 of the second motor generator MG2 with the use of such a relatively large FB gain can rotatably drive the first sun gear S1 in a normal rotating direction with the power-running torque T1 of the first motor generator MG1, with the rotation speed Nmg2 of the transfer member 18 kept at a predetermined target rotation speed. This starts up the engine 10 in the normal rotating direction against the engine load torque Te, thereby starting up the engine 10. During such operation, the engine start-up control is executed in the same way as that of step S3 shown in FIG. 8. Therefore, the engine rotation speed NE is caused to immediately increase due to a large power-running torque T1 of the first motor generator MG1 to escape the resonant region within a short period of time. Thus, there is no fear of shock occurring due to resonance.

On the contrary, at step R2 wherein the output of the first motor generator MG1 is limited, a smaller FB gain than the normal value determined at step R3 is determined so as to obtain a deviation allowable value greater than that of step R3. Performing the feedback control using such a small FB gain allows the rotation speed Nmg2 of the transfer member 18 to easily vary from the target rotation speed due to disturbance. As a result, even under a circumstance where the engine rotation speed NE stays in the resonant region for an extended period of time due to the output limitation of the first motor generator MG1, the rotation speed Nmg2 of the transfer member 18 is caused to vary from the target rotation speed. This allows the engine load torque Te to escape, thereby suppressing the occurrence of amplified engine load torque fluctuation caused by resonance.

The deviation allowable value, i.e., the gain (FB gain) for feedback control may be preliminarily determined to have a constant value. However, if the FB gain is too large for the torque (MG1 limiting torque) which the first motor generator MG1 is available to output, the rotation speed variation of the transfer member 18 hardly occurs with a resultant difficulty of appropriately suppressing the amplified engine load torque fluctuation. In contrast, if the FB gain is too small for the power-running torque T1, the rotation speed variation of the transfer member 18 is permitted at a rate more than necessary with a difficulty to adequately accept the reactive force of the engine load torque Te. This result in the occurrence of a delay in rise time of the engine rotation speed NE, thereby blocking start-up of the engine 10. To address such an issue, the rotation-fluctuation permitting means 104 of the present embodiment includes FB-gain calculating means 106 that is operative to determine the FB gain depending on the torque (MG1 limiting torque) which the first motor generator MG1 is available to output, and that calculates the FB gain accordance with a flowchart shown in FIG. 17. In addition, if the MG1 limiting torque has a fixed value, then, a fixed FB gain can be properly determined in advance depending on the resulting MG1 limiting torque. Thus; there is no need to necessarily provide the FB-gain calculating means 106.

Figure 17:
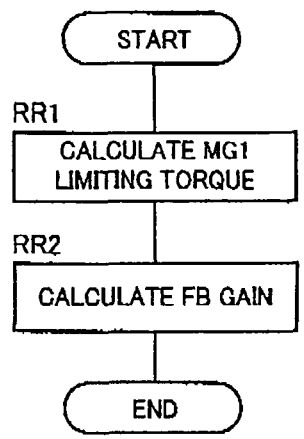
FIG. 17 is a flow chart illustrating a processing sequence to be executed in FB-gain calculating means shown in FIG. 15.
Figure 18:
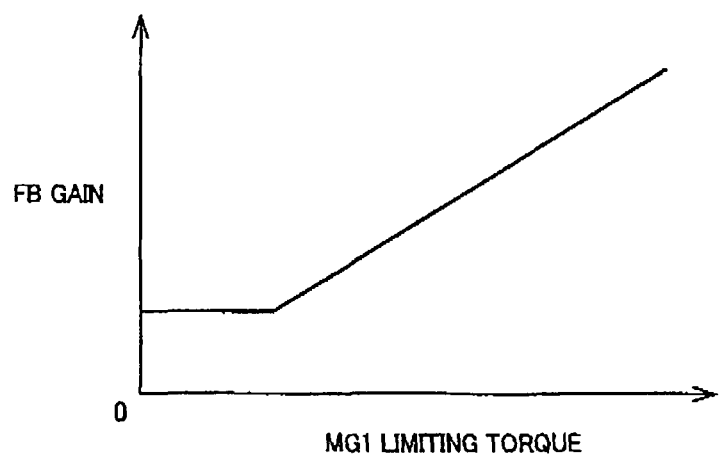
FIG. 18 is a view showing one example of a map used in calculating an FB gain depending on the MG1 limiting torque to be executed at step RR2 in FIG. 17.

At step RR1 in FIG. 17, the MG1 limiting torque is calculated in the same manner as those of step SS1 in FIG. 9 and at step RR2, the gain (FB gain) for the feedback control is calculated depending on the resulting MG1 limiting torque by referring to a map or the like shown for instance in FIG. 18. The lower the MG1 limiting torque is, the slower the rise time of the engine rotation speed NE becomes with a resultant increase of a time period for the engine rotation speed NE to stay in the resonant region. This increases a probability of causing amplified engine load torque fluctuation caused by resonance. To avoid such a probability, the map shown in FIG. 18 is basically determined such that the FB gain decreases with a decrease in MG1 limiting torque. However, if the FB gain falls below a predetermined value, then, the rotation speed variation of the transfer member 18 increases, which blocks the increase of rise time of the engine rotation speed NE with a resultant remarkable delay in start-up of the engine 10, resulting in a fear of a difficulty to initiate engine start-up. To prevent such an affect, the FB gain map shown in FIG. 18 is provided with a predetermined lower limit such that the FB gain is sustained at a predetermined lower limit value regardless of a drop in MG1 limiting torque.

Figure 21:
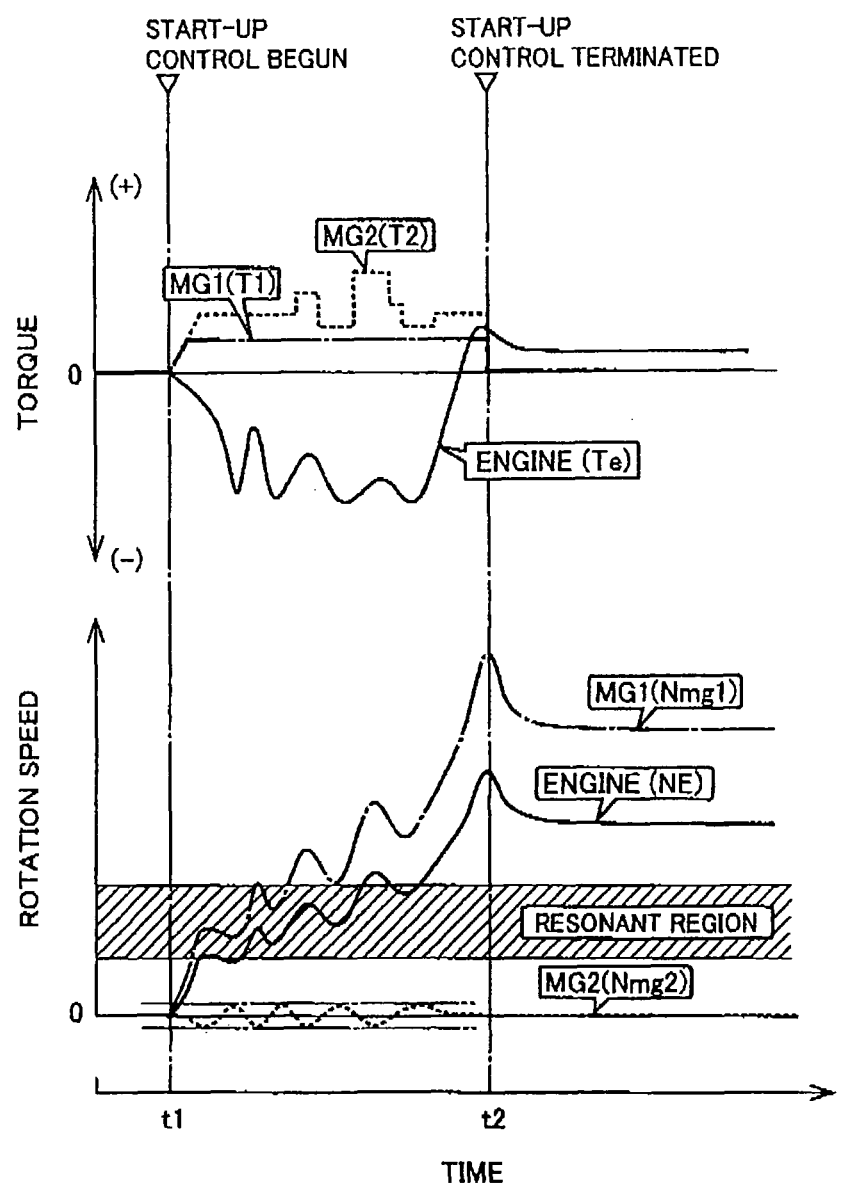
FIG. 21 is one example of a timing chart showing variations in torques and rotation speeds of the various parts when the engine start-up control is executed by executing operation at step R2 shown in FIG. 6, with the output of the first motor generator for engine start-up being limited.

With the FB gain determined in such a way, a rotation-speed reference reactive-force control is executed using such a resulting FB gain to perform the feedback control for the reactive torque T2. This suppresses, with suppressing amplified engine load torque fluctuation caused by resonance, the rotation speed variation resulting from a reduction in the FB gain of the transfer member 18 to a required minimum level for thereby appropriately starting up the engine 10. FIG. 21 is a view, corresponding to the timing chart shown in FIG. 13, which represents a case in which the rotation-speed reference reactive-force control is executed during a halt of the vehicle to perform the feedback control for the reactive torque T2 of the second motor generator MG2, and the engine start-up control is performed. Since the power-running torque T1 of the first motor generator MG1 is limited, the engine rotation speed NE stays in the resonant region for an extended period of time. However, varying the rotation speed Nmg2 of the transfer member 18 with the fluctuation in the engine load torque Te allows the engine load torque to escape, thereby suppressing the occurrence of amplified engine load torque fluctuation caused by resonance and minimizing the rotation speed variation of the transfer member 18 to the required minimum level. Therefore, the engine rotation speed NE is caused to increase as fast as possible regardless of such a rotation speed variation, thereby causing the engine 10 to start up within a relatively short period of time, FIG. 21 shows such a rotation speed Nmg2 with a varying range or varying width, equivalent to the deviation allowable value, which is determined with the FB gain to vary such that the lower the FB gain, the greater will be the varying range.

Figure 19:
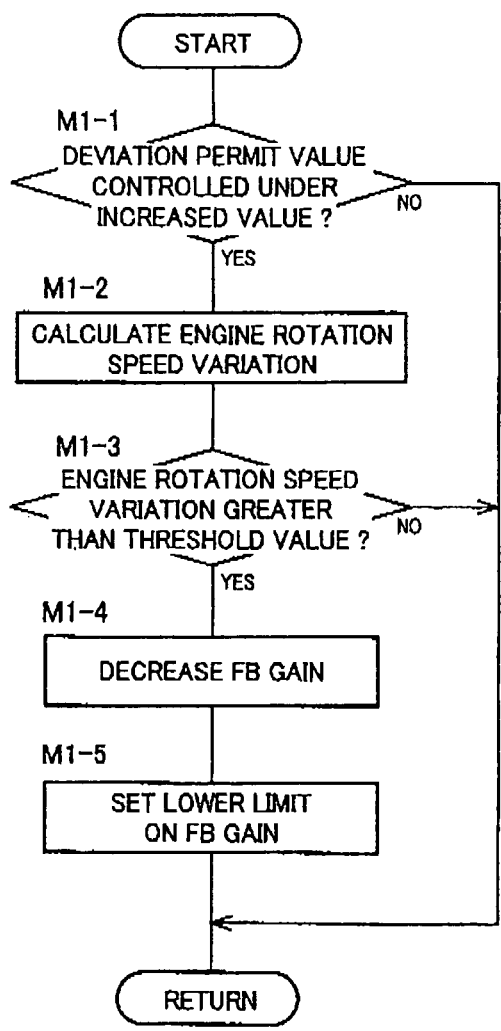
FIG. 19 is a flow chart illustrating a processing sequence to be executed when the FB-gain correcting means, shown in FIG. 15, corrects an FB gain depending on the rotation speed variation amount of the engine.
Figure 20:
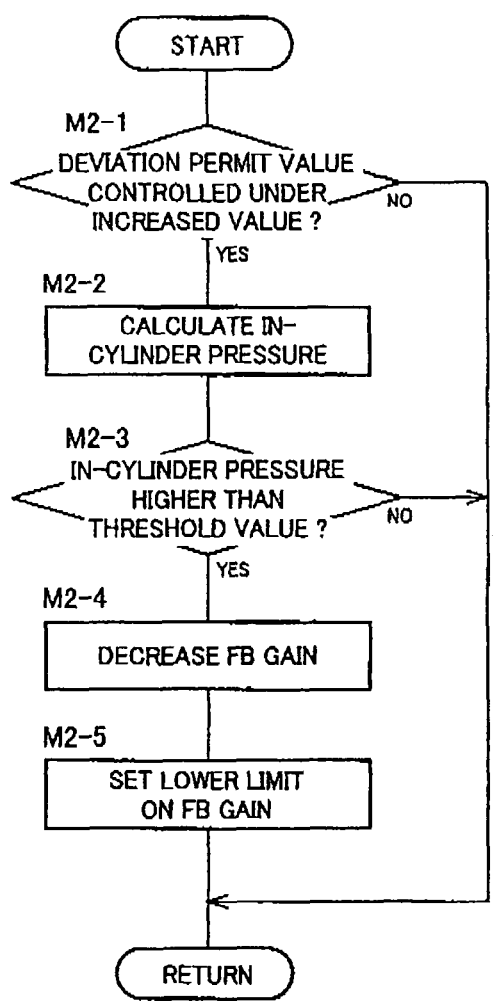
FIG. 20 is a flow chart illustrating a processing sequence to be executed when the FB-gain correcting means, shown in FIG. 15, corrects the FB gain depending on the in-cylinder pressure of the engine.

Turning back to FIG. 15, the rotation-fluctuation permitting means 104 further includes FB-gain correcting means 108, which executes signal processing in accordance with the flowcharts shown in FIGS. 19 and 20 to correct the FB gain on a real time basis to perform the engine start-up control in a further appropriate manner. The FB-gain correcting means 108 may be provided on needs and may be used in place of the FB-gain calculating means 106. In addition, both of correction processing, shown in FIGS. 19 and 20, may be executed or either one of these processing may be conducted depending on needs.

At step M1-1 in FIG. 19, a query is made as to whether, during the engine start-up control with the output of the first motor generator MG1 being limited, the rotation-speed reference reactive-force control for the second motor generator MG2 is under execution in feedback control with the use of the deviation allowable value greater than the normal value, i.e., the feedback control with the use of the FB gain less than the normal value. If rotation-speed reference reactive-force control is under execution with the use of the FB gain less than the normal value, then, operations subsequent to step M1-2 are executed. At steps M1-2 and M1-3, the same controls as those of steps Q1-2 and Q1-3 shown in FIG. 11 are executed to acquire the variation of the engine rotation speed NE, thereby making a query as to whether such a variation is greater than a predetermined threshold value. If the variation of the engine rotation speed NE is less than the threshold value, the operation is terminated intact to sustain the current FB gain. If the variation exceeds the threshold value, then, steps M1-4 is executed to decrease the FB gain. The amount of such a decrease in the FB gain may have a fixed value but may be determined such that the greater the variation amount is, the greater the reduction amount will be. If the FB gain falls below a predetermined value due to an increase of the variation of the engine rotation speed NE, then, the rotation speed variation of the transfer member 18 blocks an increase of the engine rotation sped NE. This results in a remarkable delay or disability in start-up of the engine 10, and hence at step M1-5, the FB gain is provided with a given lower limit.

Performing the feedback control of the reactive torque T2 using the FB gain corrected in such a way further appropriately suppresses amplified engine load torque fluctuation caused by resonance. That is, since the rotation speed variation of the engine 10 is associated with the engine load torque fluctuation, the increase of the engine rotation speed variation is reflected in amplified engine load torque fluctuation. The gain (FB gain), used for the feedback control of the reactive torque T2, is caused to decrease depending on an actual engine rotation speed variation. This can appropriately suppress, with suppressing occurrence of a delay in start-up of the engine 10 resulting from the rotation speed variation of the transfer member 18 at a rate more than necessary, the occurrence of amplified engine load torque fluctuation caused by resonance. In addition, correcting the FB gain depending on such an actual engine rotation speed variation can appropriately perform the engine start-up control regardless of an individual difference among vehicles and temporal changes thereof.

With the present embodiment, the FB gain is merely caused to decrease depending on the actual engine rotation speed variation. In an alternative, modifications may be made such that a learning correction may be performed to shift a whole of the map shown in FIG. 18 downward according to the correction of such an FB gain, to rewrite only data associated with current MG1 limiting torque. In another alternative, a learning correction may be made to increase or decrease the FB gain map shown in FIG. 18 for allowing the resulting correction to be reflected on a subsequent engine start-up control.

FIG. 20 shows a case in which the FB gain is corrected on a real time basis depending on the in-cylinder pressure of the engine 10. Step M2-1 is identical to step M1-1 described above and steps M2-2 and M2-3 are identical to steps Q2-2 and Q2-3 shown in FIG. 12. If the in-cylinder pressure is less than a threshold value, then, the operation is completed intact to allow the current FB gain to be maintained. If the in-cylinder pressure exceeds the threshold value, then, steps M2-4 and M2-5 are executed to correct the FB gain in the same manner as those of steps M1-4 and M1-5 shown in FIG. 19.

Also in such a case, the feedback control is performed on the reactive torque T2 using such a corrected FB gain, further appropriately suppressing amplified engine load torque fluctuation caused by resonance. That is, an increase of the in-cylinder pressure increases the engine load torque Te to easily cause resonance. Therefore, the gain (FB gain) of the feedback control for the reactive torque T2 is decreased depending on an actual in-cylinder pressure. This can appropriately suppress, with preventing the occurrence of a delay in start-up of the engine 10 caused upon the rotation speed variation of the transfer member 18 permitted at a rate more than necessary, the engine load torque fluctuation due to resonance. In addition, correcting the FB gain depending on such an actual in-cylinder pressure can appropriately perform the engine start-up control regardless of an individual difference among vehicles and temporal changes thereof.

With the present embodiment, only the FB gain has been lowered depending on the actual in-cylinder pressure. If applied to for instance a flexible fuel vehicle, a learning correction may be performed to shift a whole of the map shown in FIG. 18 downward in accordance with the correction of the FB gain, or to rewrite only data associated with the current MG1 limiting torque. Moreover, in another alternative, a learning correction may be made to increase or to decrease the FB gain depending on the actual in-cylinder pressure, and to increase or decrease the FB gain map shown in FIG. 18 for reflecting such correction on subsequent engine start-up control.

Figure 22:
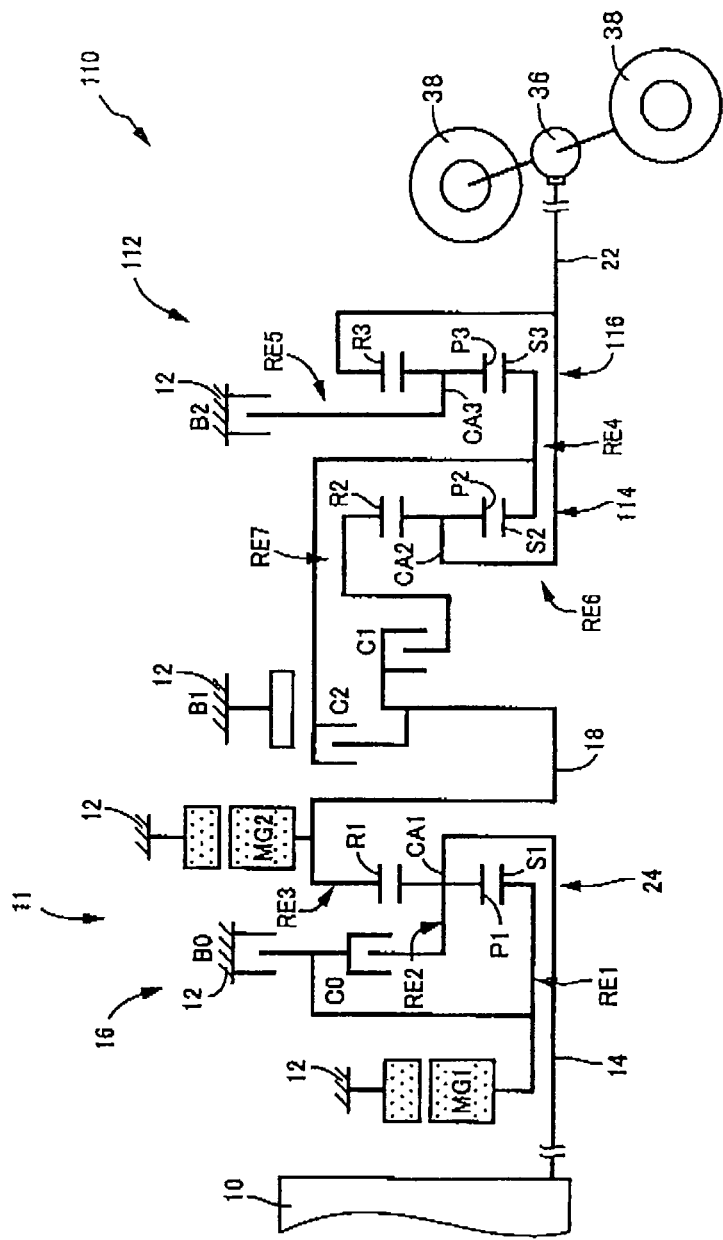
FIG. 22 is a skeleton view, corresponding to FIG. 1, which is a view illustrating another hybrid vehicle drive apparatus to which the present invention is preferably applied.
Figures 23, 24:
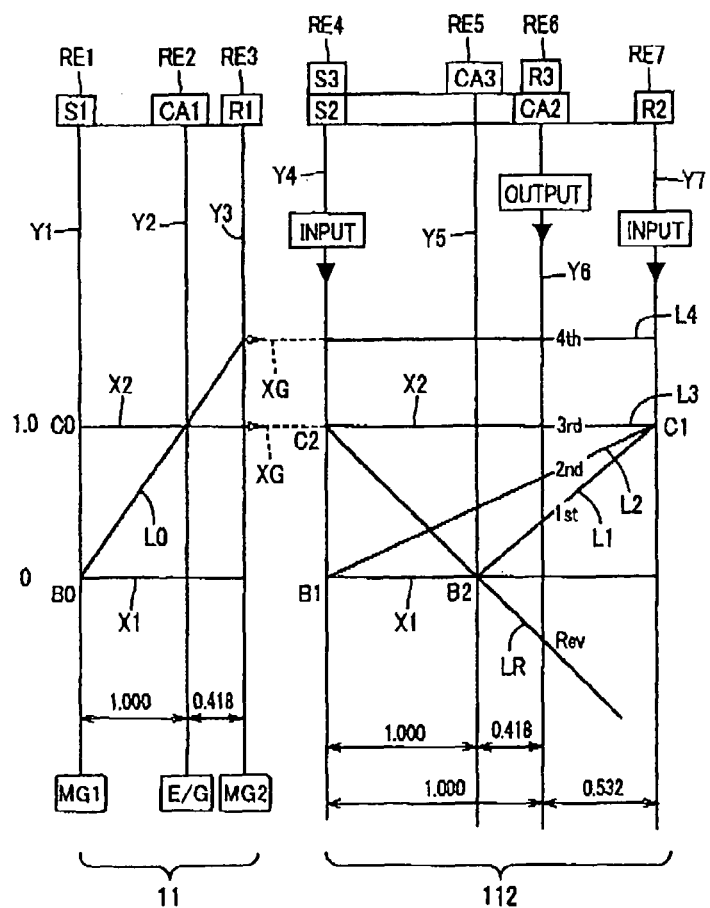
FIG. 23 is an operation table illustrating the relationship in combination between shifting operations for the vehicular drive apparatus shown in FIG. 22 to be operated in a continuously variable shifting mode or in a step-variable shifting mode, and operations of hydraulically operated friction-engagement devices used in such shifting operations.
FIG. 24 is a collinear chart illustrating a relative rotation speed between gear positions, when a shifting mechanism of the vehicular drive apparatus, shown in FIG. 22, is operated in the step-variable shifting mode.

FIGS. 22 to 24 are views, illustrating another drive apparatus for a hybrid vehicle to which an engine start-up control of the present invention is applied, and correspond to FIGS. 1 to 3. In the present embodiment, an automatic shifting portion 112, employed in place of the automatic shifting portion 20, mainly includes a pair of planetary gear sets 114 and 116. A whole of a shifting mechanism 110, combined with the switchable type shifting portion 11 previously mentioned, selectively establishes various gear positions in a manner as shown in an engagement operation table shown in FIG. 23. The various gear positions include four forward-drive gear positions covering a 1st-speed gear position "1st" to a fourth speed gear position "4th", a reverse-drive gear position "R" or a neutral "N". Even such a vehicular drive apparatus can perform the same engine start-up control as that of the embodiment set forth above.

While the present invention has been described above in detail with reference to the embodiments shown in the drawings, the embodiments are described to be considered only as illustrative of the present invention. The present invention may be implemented in various modifications and improvements in the light of knowledge of those skilled in the art.

What is claimed is:

1. An engine start-up control device for a vehicle which includes a differential mechanism connected to an engine generating a drive power by combustion of fuel, a first electric motor, and a reactive-force receiving member whose rotation is restricted with a reactive torque controlled by a reactive-force control device, the engine start-up control device starting up the engine by driving thereof by the first electric motor under a condition where the reactive-force control device restricts the rotation of the reactive-force receiving member,
the engine start-up control device including a rotation-fluctuation permitting device configured to control the reactive-force control device such that during an engine start-up in an output limiting state of the first electric motor, a rotation speed of the reactive-force receiving member varies at a greater rate than that in a state where the output of the first electric motor is unlimited.

2. The engine start-up control device according to claim 1, wherein during the engine start-up in the output limiting state of the first electric motor, the reactive torque of the reactive-force control device is decreased to permit the rotation speed of the reactive-force receiving member to vary at the greater rate than that in the state where the output of the first electric motor is unlimited.

3. The engine start-up control device according to claim 1, wherein during the engine start-up in the output limiting state of the first electric motor, a torque reference reactive-force control, to control the reactive torque of the reactive-force control device in accordance with a target torque, is executed.

4. The engine start-up control device according to claim 3, wherein the target torque is varied such that the lower an output power of the first electric motor in the output limiting state is, the smaller the target torque will be.

5. The start-up control device according to claim 3, wherein when a start-up time of the engine in the output limiting state by the first electric motor expires a pre-determined term, a target torque of the reactive-force receiving member is changed higher than a target torque used in the pre-determined term.

6. The engine start-up control device according to claim 3, wherein during the engine start-up in the output limiting state of the first electric motor, a variation amount of the rotation speed of the engine is detected and the target torque is varied such that the greater a rotation speed variation is, the smaller the target torque will be.

7. The start-up control device according to claim 6, wherein the target torque of the reactive-force receiving member is determined such that the greater a rotation speed variation of the engine is, the lower the target torque is.

8. The engine start-up control device according to claim 3, wherein during the engine start-up in the output limiting state of the first electric motor, an in-cylinder pressure of the engine is detected and the target torque is varied such that the higher the in-cylinder pressure is, the smaller the target torque will be.

9. The start-up control device according to claim 8, wherein the in-cylinder pressure of the engine is estimated based on opening and closing signals commanding openings of intake and exhaust valves of the engine.

10. The engine start-up control device according to claim 1, wherein during the engine start-up in the output limiting state of the first electric motor, a rotation-speed reference reactive-force control, to control the reactive torque of the reactive-force control device such that a rotation speed of the reactive-force receiving member follows a predetermined target rotation speed, is executed, and a deviation allowable value in the rotation speed of the reactive-force receiving member controlled by the rotation-speed reference reactive-force control is set to a value allowing the rotation speed of the reactive-force receiving member to vary at a predetermined rate.

11. The start-up control device according to claim 10, wherein when a start-up time of the engine in the output limiting state by the first electric motor expires a pre-determined term, a deviation allowable value in the rotation speed of the reactive-force receiving member is changed lower than a deviation allowable value used in the pre-determined term.

12. The engine start-up control device according to claim 1, wherein
the differential mechanism is disposed in a power transmitting path between an output shaft of the engine and drive wheels; and
the reactive-force control device includes a second electric motor disposed to give a drive power to the power transmitting path and to receive the drive power from the power transmitting path.

13. The start-up control device according to claim 1, wherein the vehicle includes a drive shaft for driving drive wheels, and
wherein the reactive-force receiving member is indirectly connected to the drive shaft.

14. The start-up control device according to claim 1, wherein the reactive torque of the reactive-force receiving member is controlled to be maintained at a pre-determined constant torque in the output limiting state of the first electric motor.

15. The start-up control device according to claim 1, wherein the reactive-force control device includes a friction-engaging device operative to connect and disconnect a power transmitting path between the differential mechanism and drive wheels of the vehicle, and
wherein the reactive torque of the reactive-force receiving member is controlled by changing an engaging torque of the friction-engaging device.

16. The start-up control device according to claim 1, wherein the vehicle includes a battery that functions as a power source of the first electric motor, and
wherein the output limiting state of the first electric motor is determined based on a predetermined output limiting value of the battery.

17. The start-up control device according to claim 1, wherein the vehicle includes a battery that functions as a power source of the first electric motor, and
wherein the output limiting state of the first electric motor is determined based on a temperature of the battery.

18. The start-up control device according to claim 1, wherein the vehicle includes an automatic shifting portion having a friction-engaging device, which is connected to the differential mechanism through the reactive-force receiving member.

19. The start-up control device according to claim 1, wherein when a start-up time of the engine in the output limiting state by the first electric motor expires a pre-determined term, an allowable range of a rotation speed variation of the reactive-force receiving member is changed smaller than an allowable range used in the pre-determined term.

20. The start-up control device according to claim 1, wherein a varying range of the rotation speed of the reactive-force receiving member is changed such that the greater a rotation speed variation of the engine is, the greater the varying range is.

* * * * *